United States Patent
Kabra et al.

(10) Patent No.: US 7,685,194 B2
(45) Date of Patent: Mar. 23, 2010

(54) FINE-GRAINED ACCESS CONTROL IN A DATABASE BY PREVENTING INFORMATION LEAKAGE AND REMOVING REDUNDANCY

(75) Inventors: Govind Kabra, Urbana, IL (US); Ravishankar Ramamurthy, Redmond, WA (US); Sundararajarao Sudarshan, Mumbai, IN (US)

(73) Assignee: Microsoft Corporation, Redmond, WA (US)

( * ) Notice: Subject to any disclaimer, the term of this patent is extended or adjusted under 35 U.S.C. 154(b) by 243 days.

(21) Appl. No.: 11/468,928

(22) Filed: Aug. 31, 2006

(65) Prior Publication Data
US 2008/0071785 A1 Mar. 20, 2008

(51) Int. Cl.
G06F 17/30 (2006.01)
G06F 15/16 (2006.01)
(52) U.S. Cl. .................. 707/719; 707/718; 707/714
(58) Field of Classification Search ............. 707/9
See application file for complete search history.

(56) References Cited

U.S. PATENT DOCUMENTS
6,567,802 B1 * 5/2003 Popa et al. ............. 707/3

2005/0177570 A1 * 8/2005 Dutta et al. ............. 707/9

OTHER PUBLICATIONS

Galindo-Legaria. "Outerjoins as Disjunctions". ACM. 1994.*
Rizvi et al. "Extending Query Rewriting Techniques for Fine-Grained Access Control". ACM. 2004.*
Rjaibi, Walid. "An Introduction to Multilevel Secure Relational Database Management Systems". 2004.*
Kabra, et al."Paper ID: 464 Implementing Fine Grained Access Control" (2006) Submission to SIGMOD Conference, ACM, 12 pages.

* cited by examiner

Primary Examiner—Tony Mahmoudi
Assistant Examiner—Brittany N McCue
(74) Attorney, Agent, or Firm—Lee & Hayes, PLLC

(57) ABSTRACT

Fine-grained access control for querying a database with low overhead and safety plans. In a view placement approach, base relations of the query expression are replaced by views that are appropriate for the particular user. Information leakage via UDF pushing, exception processing, and error messages can be prevented by generating safe plans. An existing query optimizer can be modified to perform redundancy removal and safe plan implementation. Subsumption testing available in materialized view matching can be exploited by the query optimizer. Authorization inference is exploited to generate safe plans.

18 Claims, 16 Drawing Sheets

FINE-GRAINED ACCESS CONTROL IN A DATABASE BY PREVENTING INFORMATION LEAKAGE AND REMOVING REDUNDANCY

BACKGROUND

The current SQL standard for access control is coarse grained, in that it grants access to all rows of a table or none. Fine-grained access control, which allows control of access at the granularity of individual rows, is required in practically all database applications, for example, to ensure that employees can see only their own data, and relevant data of other employees that they manage. While fine-grained access control has traditionally been performed at the level of application programs, there is an increasing need to support it at the database level. However, implementing security at the application level makes management of authorization quite difficult. In addition to presenting a large surface area for attackers, any breach of security at the application level exposes the entire database to damage, since every part of the application has complete access to the data belonging to every application user.

There are several models for fine-grained access control. In a class of models, called Truman models, one conventional architecture provides access control through functions that return strings containing predicates. A function is associated with each relation, and when invoked, returns a string containing predicates that enforce fine-grained access control; the function takes as input the mode of access and an application context which includes information such as user-id of the end user. In another conventional system, policy-based security management allows specification of predicates that are added to WHERE clauses. Different policies can be specified on different columns and are automatically combined.

Cell-level access control is another conventional fine-grained access methodology; however, this technique is restricted to handling privacy policies, and does not constitute a general-purpose access control mechanism. Others include using predicated grants to manage cell-level access control and adding predicates to SQL (structured query language) authorization grants.

A non-Truman model can be attractive for several reasons, such as guaranteeing correctness. That is, if a query is accepted, it will give the same result as if the user had full authorizations on all relations. In contrast, in the class of Truman models, the result of a query can be changed by the authorization mechanism. However, any non-Truman model implementation is likely to be unpredictable in the following sense: the model requires a powerful query inferencing mechanism and since inferencing can never be complete, a query that is accepted by one database implementation may be rejected by another (perhaps even a different version of the same database system). Such unpredictability is highly undesirable for applications, which explains why the class of Truman models is used in practice.

The most commonly used models follow a view replacement strategy that replaces relations in a user query by a view of the relation that is available to that user. Application programs often use views as a way of providing restricted access to certain users. However, there are two significant problems with most implementations of the view replacement model: performance (e.g., the overhead of the access control predicates when they are actually redundant) and security (e.g., the potential of information leakage though other channels such as user-defined function (UDF) predicates and exceptions).

With respect to performance, the original query usually includes predicates/joins that restrict access to only authorized data. The authorization checks performed in the replacement views are redundant, including not only cheap comparisons, but also expensive semi-joins. The introduction of complex authorizations also significantly increases the complexity of the query, resulting in increased optimization time, in addition to worsened execution time. In the realm of security, several attacks have been discovered against the view-based approach to fine-grained access control, based on information leakage. Although the set of results of a user query are usually not affected by these attacks, these attacks are able to leak unauthorized information through channels, such as the leakage of information through UDFs, and the leakage of information through exceptions and error messages.

For example, consider a relational schema
employee(emp_id, name, dept_id, salary), and a view CREATE VIEW myemployees AS
SELECT * FROM employee
WHERE dept_id in Q1 which authorizes the user to see only the employee tuples with dept_id in the result of query Q1. Suppose now that the user issues a query SELECT * FROM myemployees
WHERE myudf(salary)

The query processor replaces the view myemployees by its definition. Suppose now that the query plan chosen by the optimizer executes the UDF myudf ( ) before the subquery Q1. As a result, the UDF is called on every salary value, including those of unauthorized tuples. The code defining myudf ( ) is not under the control of the authorization system, and can print out (or save in a separate relation) the salary values it has passed, thereby leaking unauthorized salary information.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject innovation describes fine-grained access control that grants to a particular user access to only a subset of the tuples in a relation, in contrast to a current SQL standard, which does not provide any way of giving different authorizations to different rows.

In one aspect, an existing query optimizer can be modified to perform redundancy removal and safe plan implementation. Information leakage can be prevented via UDF push-down, exception processing and error messages. In a view replacement approach, base relations of the query expression are replaced by a view that is appropriate for the particular user. Subsumption testing available in materialized view matching can be exploited by the query optimizer. The optimizer can also be rule-based to generate safe query plans for UDFs.

In another aspect, redundancy removal and safe UDF pushdown can be incorporated into an existing rule-based optimizer framework through the user of transformation rules.

In yet other aspects of the subject invention, methodologies are provided that generate optimal safe plans, preventing leakage through unverified UDFs via exceptions and/or error messages.

In still another aspect, techniques are provided for removing redundant semi-joins, and exploiting existing view matching code.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
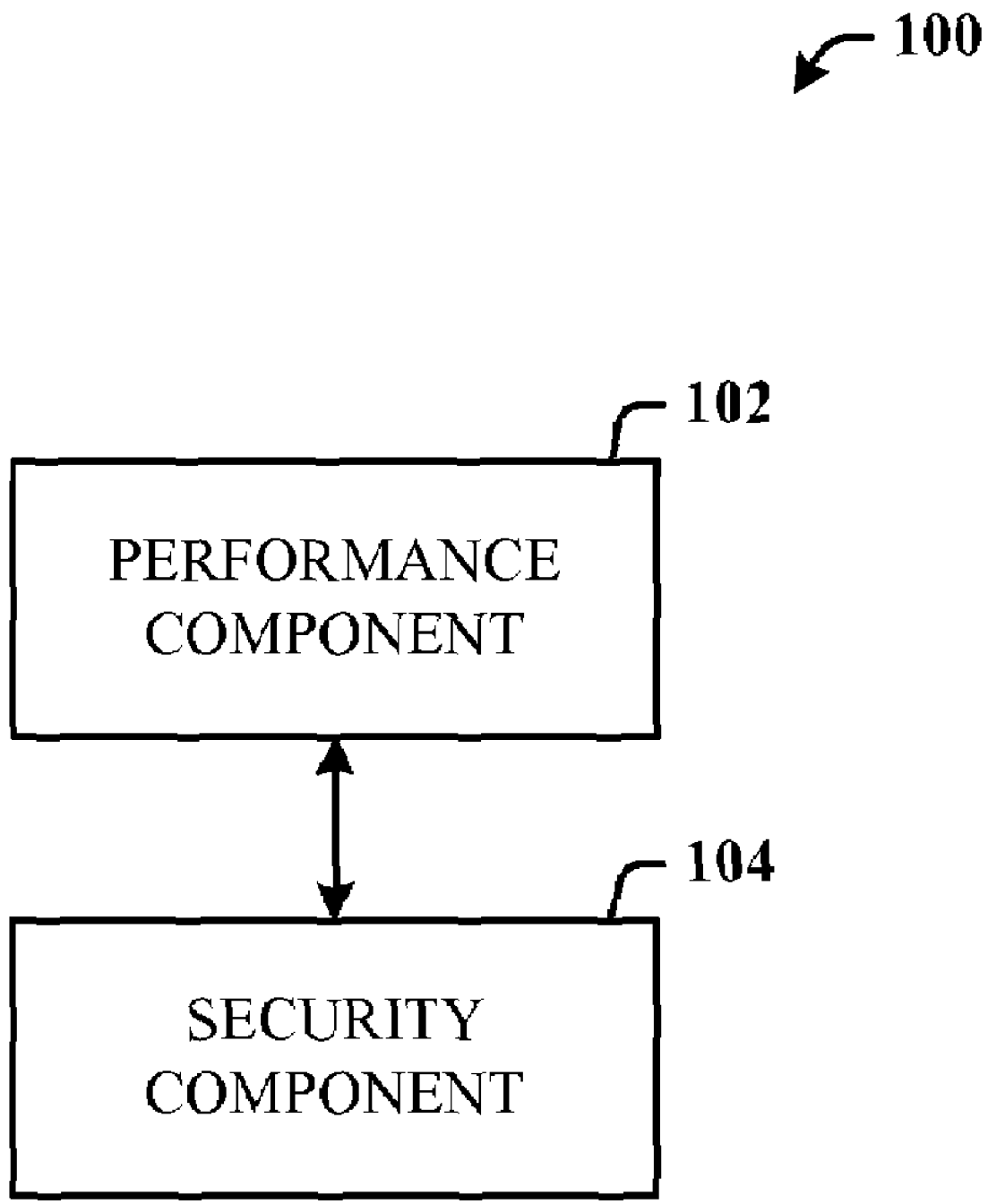
FIG. 1 illustrates a system that facilitates fine-grained access control in a database in accordance with a novel aspect.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Referring initially to the drawings, FIG. 1 illustrates a system 100 that facilitates fine-grained access control in a database in accordance with a novel aspect. The system 100 can include a performance component 102 that at least one of detects and removes redundant authorizations associated with a query expression, and a security component 104 that prevents information leakage associated with the query expression.

Figure 2:
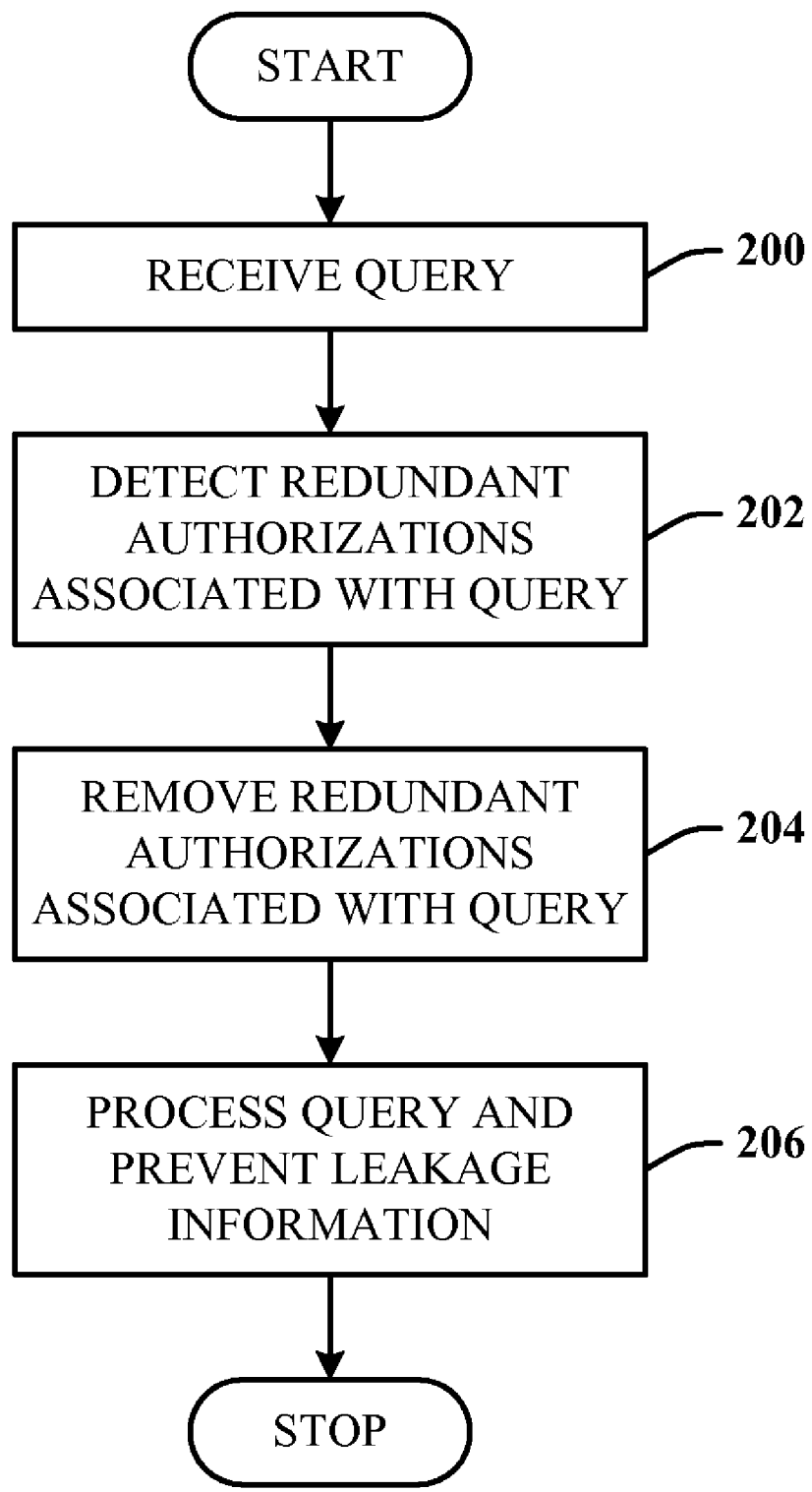
FIG. 2 illustrates a methodology of providing fine-grained access control of a database according to an innovative aspect.

FIG. 2 illustrates a methodology of providing fine-grained access control of a database according to an innovative aspect. While, for purposes of simplicity of explanation, the one or more methodologies shown herein, e.g. in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, a query is received. At 202, a query optimizer processes the query to enhance performance by detecting redundant authorizations. The query optimizer formulates a query plan to fetch the data rows that are required to process a query. The optimizer can evaluate the different ways in which a query can be performed. For example, the optimizer can determine whether indexes should be used. If the query includes a join, the optimizer can determine the join plan and the order in which tables are evaluated or joined. Additionally, the optimizer can compare the cost associated with processing each plan to determine the best one hat will be processed. The cost can be derived from estimates of the number of I/O operations required, calculations to produce the results, rows accessed, sorting, etc. At 204, the redundant authorizations are removed. At 206, security considerations are addressed by processing the query to prevent leakage information.

Figure 3:
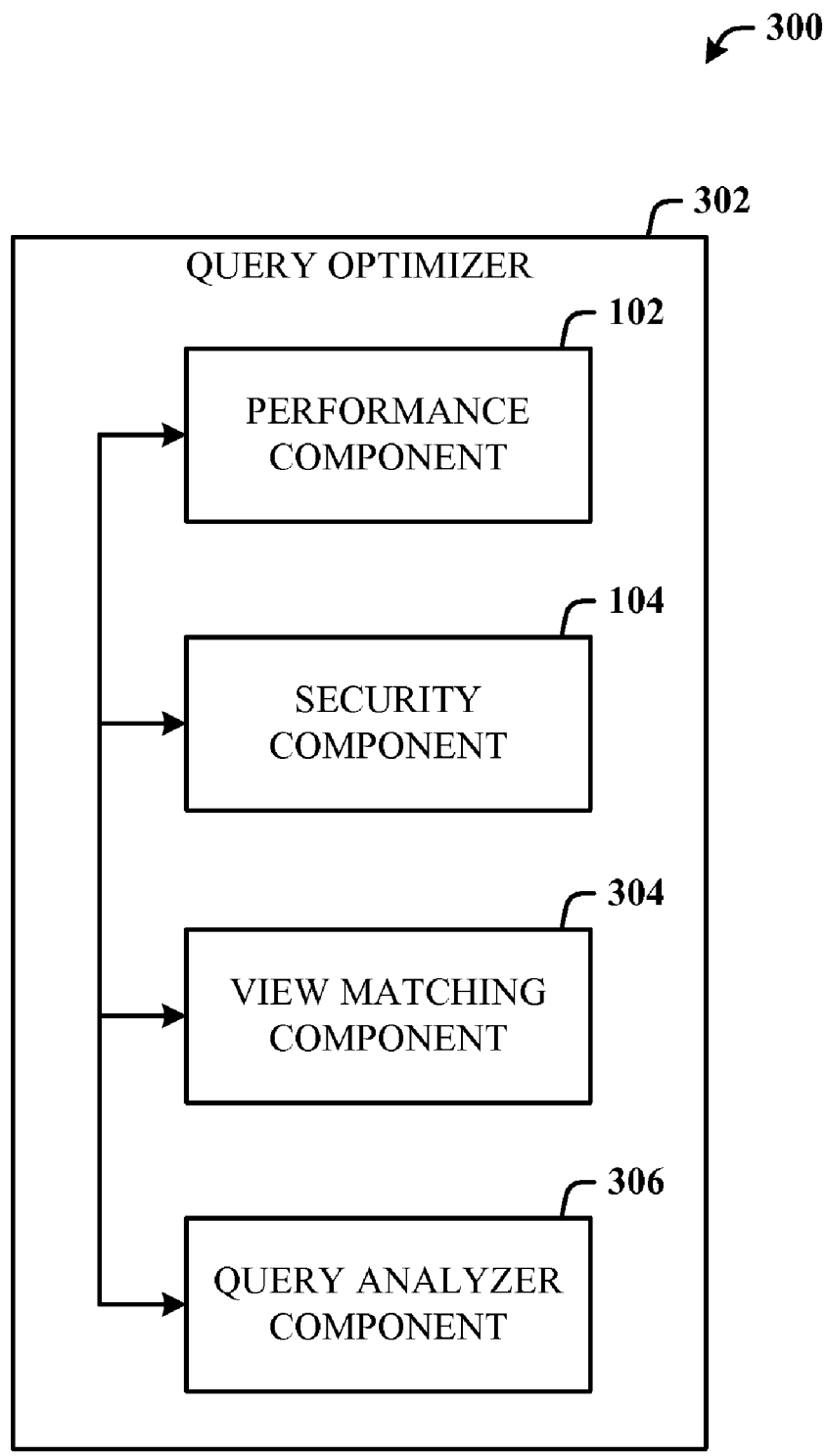
FIG. 3 illustrates a query system in accordance with another aspect.

Referring now to FIG. 3, there is illustrated a query system 300 in accordance with another aspect. The system 300 can include a query optimizer 302, which is the component of a database management system used to analyze queries submitted to the database server for execution, and then determine an optimal way to execute the query (also referred to a query plan or query execution plan). Typically, the query optimizer 302 is not directly accessible by a user. Rather, once queries are submitted to the database server and parsed by the parser, the query is then passed to the query optimizer 302 where optimization occurs.

A query execution plan outlines how the server query optimizer 302 will run a specific query. A query plan is an important tool in performance tuning of a query or database. The query plan is an ordered set of steps used to access information in a SQL relational database management system. This is a specific case of a relational model concept of access plans. Since SQL is declarative, there are typically a large number of alternative ways to execute a given query, each way varying widely in performance. The query optimizer 302 evaluates all of the different possible plans for executing the query and returns what it considers the best alternative.

This information is valuable when troubleshooting why a specific query is running slow. In operation, when a query is input that selects rows, the query is analyzed by an analyzer component 306, for example, to determine if any optimizations can be used to process the query more quickly. The optimizer 302 attempts to reject rows sooner to eliminate rows from consideration, thereby more efficiently facilitating finding the rows that do match the query criteria. Queries can be processed more quickly if the most restrictive tests can be performed first. A task of the query optimizer 302 is to find an optimal plan for executing an SQL query. Because the difference in performance between "good" and "bad" plans can be orders of magnitude, most query optimizers perform a relatively exhaustive search for an optimal plan among all possible query evaluation plans.

As illustrated, the query optimizer 302 can also include the performance component 102 and the security component 104 that are described in FIG. 1. Additionally, in a view replacement approach, a view matching component 304 facilitates replacing base relations of the query by matching views.

As described herein, redundancy checks can be integrated into a commercial optimizer, exploiting existing functionality that supports materialized view matching. Note that algorithms that detect redundant joins have been available from the early days of databases. A novel aspect is in engineering an existing optimizer to introduce redundancy detection with low overheads thereby significantly enhancing performance.

With respect to the problem of information leakage, plans are explored that can be guaranteed to not leak information, and a class of safe plans defined that are guaranteed to not leak information. An optimal safe plan can then be found.

A method of generating safe plans for the case of user-defined functions (UDFs, also called stored procedures) is to pull UDFs to the highest level of a query plan. However, this can result in inefficient plans, for example, if the UDF provides a very tight selection. Accordingly, benefits can be obtained by placing UDFs at optimal safe locations. Note that the term unsafe function (USF) is employed herein to include UDFs, system-defined functions and operators that may reveal information, whether directly or by means of exceptions or error messages. For any fine-grained authorization implementation to be effective, it has to at least protect against information leakage.

Although there are several models for specifying fine-grained access control, the ones used in practice are typically based on rewriting of queries. It is to be noted that the novel techniques described herein are applicable to any of these models, whether based on rewriting or not.

In one example, a specific model of query rewriting is provided for concreteness. In this model, authorizations are specified by predicated grants, such as the following:

GRANT SELECT ON orders
    WHERE (o__custkey = userId( )) TO public

Here, userId ( ) is a function that returns (e.g., at runtime) the user identifier (ID) of the current database user. In these examples, for simplicity, details of the user to whom the grant is made are omitted for simplicity, and grants are assumed to be made to the user "public". The different authorizations made to a user are combined, creating an authorized view of the relation for that user. If the above grant was the only grant to userA, the authorized view of the orders relation would simply be the selection o_custkey=userId ( ) on the orders relation.

In general, the authorization predicates can have a subquery. For instance, the following grants user access to the lineitem tuples that have been ordered.

GRANT SELECT ON lineitem
WHERE EXISTS (SELECT * FROM orders
    WHERE l__orderkey = o__orderkey
    and o__custkey = userId( ))
TO PUBLIC The authorization view as shown above, contains a semi-join. Combining selections into semi-joins, it can be assumed that each relation Ri has an authorized view (Ri$\ltimes_{\theta_i}$Ai), where $\ltimes$ denotes the semi-join operation, $\bowtie$ denotes the join operation, and Ai contains the subqueries in the authorization grant.

Given a query, the query optimizer replaces the relations with the corresponding authorized views. Consider the following example query (R1$\bowtie$R2$\bowtie$ . . . $\bowtie$Rn). The rewritten query would be in the form ((R1$\ltimes_{\theta_1}$A1)$\bowtie$(R2$\ltimes_{\theta_2}$A2)$\bowtie$ . . . (Rn$\ltimes_{\theta_n}$An)).

Figure 4:
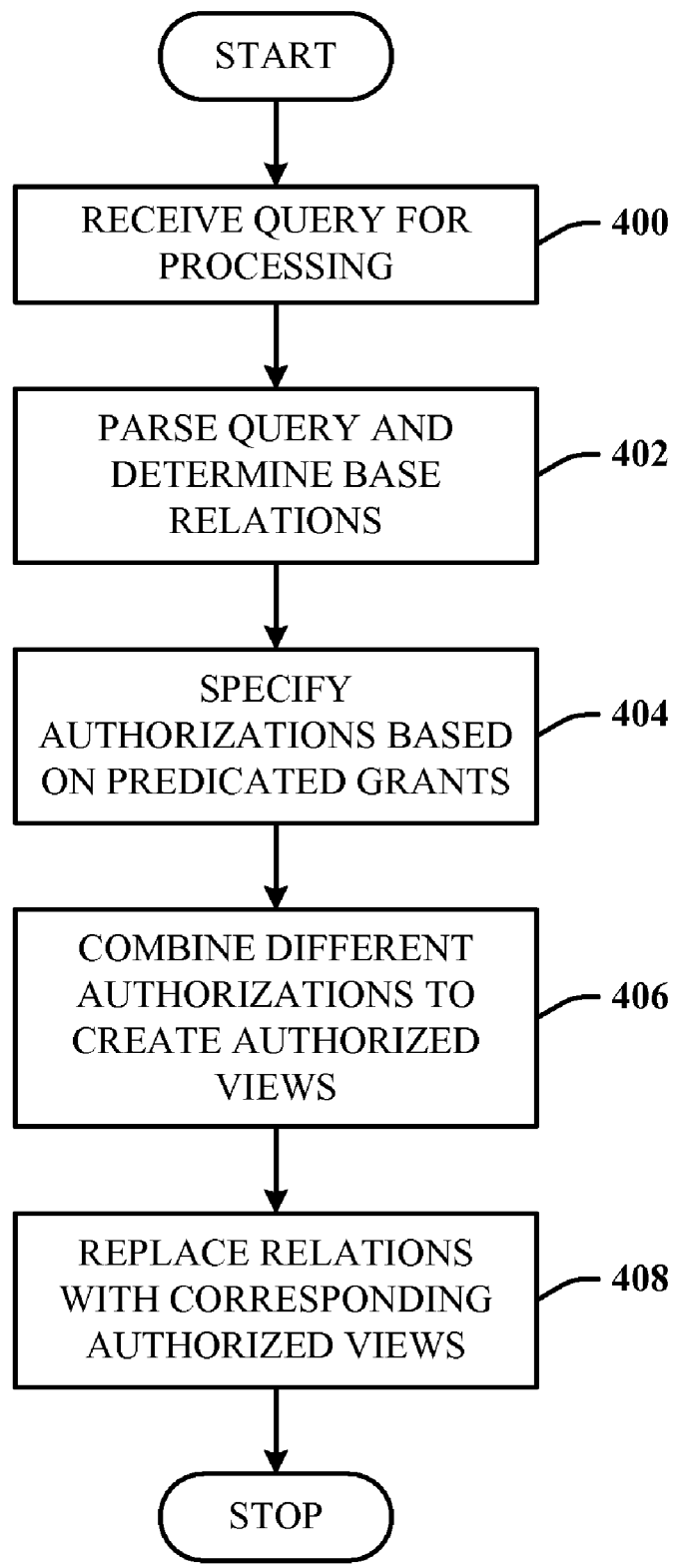
FIG. 4 illustrates a methodology of providing fine-grained access control using query rewriting, in accordance with an aspect.

Accordingly, FIG. 4 illustrates a methodology of providing fine-grained access control using query rewriting, in accordance with an aspect. At 400, a query is received for processing. At 402, the query is parsed and the base relations of the query determined. At 404, authorizations are specified by predicated grants. At 406, the different authorizations made to the user are combined creating an authorized view of the relation for that user. At 408, the optimizer replaces the relations with the corresponding authorized views. The disclosed novel techniques for redundancy removal and safe plan generation can be used in this case.

Figure 5:
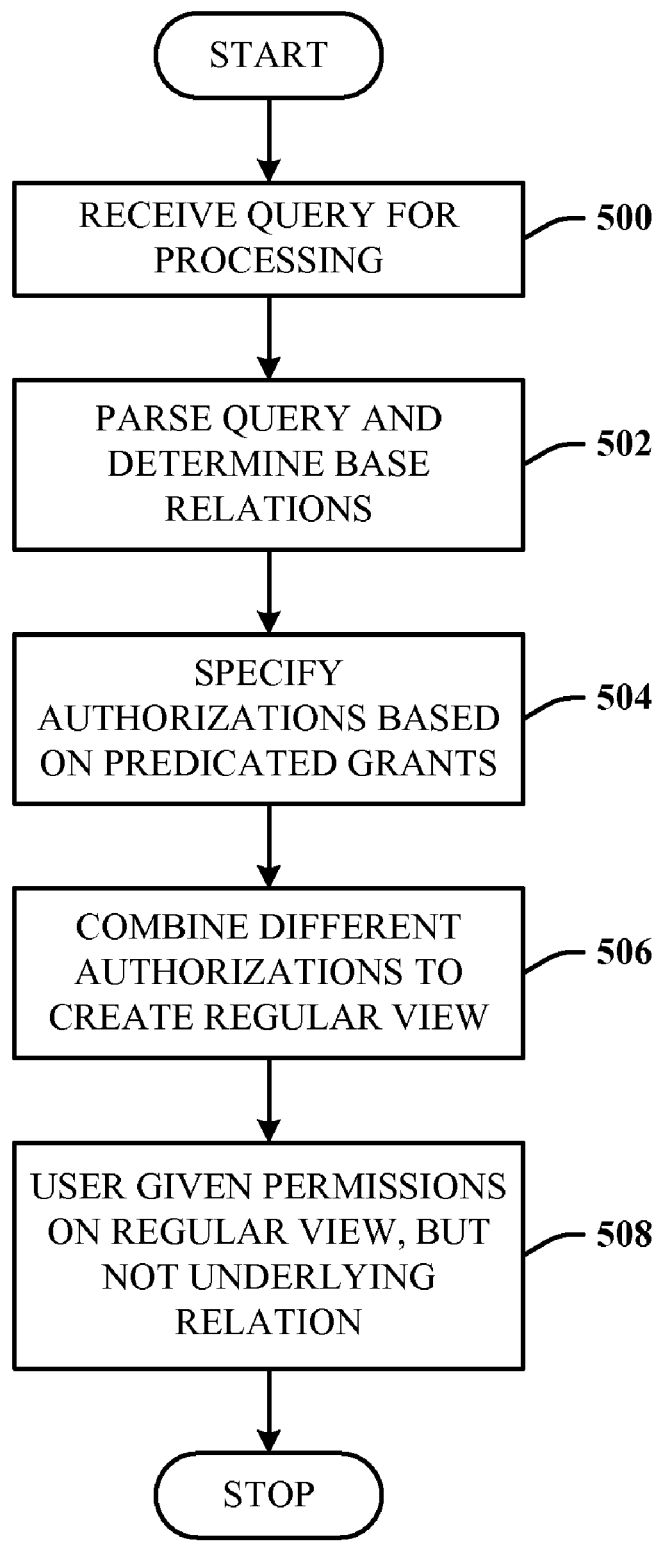
FIG. 5 illustrates an alternative methodology of providing fine-grained access control using query rewriting in accordance with an aspect.

The authorized view can alternatively be defined as a regular view, and the user given permissions on the view, but not on the underlying relation. Queries should then be written using the authorized view, which is then expanded by the query optimizer. Accordingly, FIG. 5 illustrates an alternative methodology of providing fine-grained access control using query rewriting in accordance with an aspect. At 500, a query is received for processing. At 502, the query is parsed and the base relations of the query determined. At 504, authorizations are specified by predicated grants. At 506, the different authorizations made to the user are combined creating a regular view. At 508, the user is given permissions on the regular view, but not the underlying relation. The disclosed novel techniques for redundancy removal and safe plan generation can also be used in this case.

In accordance with the disclosed architecture, the query optimizer can detect redundant cases and remove the redundant authorizations. In the view replacement approach, the base relations in a query can be replaced by authorization views which are appropriate for the particular user. These authorization views are not visible to the user. The user writes the queries on the original schema. In many cases, the original query could include predicates and/or joins that essentially restrict access to only the authorized tuples. In such cases, the additional authorization checks are not necessary. The authorizations can be fairly complex involving semi-joins. Consequently, this could lead to worsened query optimization and execution times. As described infra, redundancy checking and removal can be achieved by leveraging the existing view matching infrastructure of the query optimizer.

Following is an example that provides motivation for redundancy removal. Consider a TPC-H schema. (The TPC Benchmark™H (TPC-H) is a decision support benchmark. It consists of a suite of business oriented ad-hoc queries and concurrent data modifications.) Assume the following two grants are issued.

```
GRANT SELECT ON orders
    WHERE o_custkey = userId( )
GRANT SELECT ON lineitem
    WHERE exists (SELECT * FROM orders
        WHERE l_orderkey = o_orderkey and o_custkey
= userId( ))
```

Consider the following queries (Q1 and Q2) issued by a user with userId=123.

```
Q1: SELECT lineitem.* FROM lineitem, orders
    WHERE l_orderkey = o_orderkey and o_custkey = 123
Q2: SELECT lineitem.* FROM lineitem, orders
    WHERE l_orderkey = o_orderkey and l_shipdate > '1998-01-01'
```

The optimizer can essentially replace the relations lineitem and orders with the corresponding authorization views. Notice that Q1 accesses only tuples that are authorized; thus, the authorization checks are not required for Q1. On the other hand, the authorization checks are essential for Q2. An optimizer that is able to detect redundancy between the predicates in the original query and those in the authorization views can potentially distinguish between these two scenarios.

Although removal of redundant joins has been studied for many years, current generations of commercial optimizers such as the optimizer in SQL Server, have only very limited forms of redundancy removal. One reason is that queries have thus far rarely had redundancy, and the effort spent to detect redundancy did not provide worthwhile payoffs. The introduction of redundancy due to fine-grained access control motivates redundancy detection and removal.

Described herein are mechanisms that exploit existing code for optimization with materialized views, which include procedures to match materialized views with queries and/or parts thereof to perform redundancy removal. Redundancy removal can be implemented by means of a set of transformation rules, enabling easy deployment in a transformation-based optimizer such as the optimizer in SQL Server. Since relations are dealt with that can have duplicates, the transformation rules can apply to the case of semi-joins, rather than to joins. Interaction of these rules with other transformation rules is also addressed.

Although the exemplary syntax described herein employs grants with predicates, the techniques apply equally to conventional models where equivalent predicates can be added to the WHERE clause of queries, and the use of views to grant predicated access to relations, with queries referencing the views instead of the actual relation. Redundancy can get introduced with either of these approaches and the redundancy removal techniques described herein are applicable to all of these approaches.

In this context, an expression E2 is said to subsume expression E1, if $E1 \bowtie_\theta E2 = E1$. Thus, if E2 subsumes E1, then $E1 \bowtie_\theta E2$ can be transformed to E1. Although it is difficult to get necessary conditions for subsumption, sufficient conditions can be used to test for subsumption. For example, the subsumption tests already available in a materialized view matching component (e.g., the component 304 of FIG. 3) of a query optimizer can be exploited.

Subsumption checking used in the view matching component of SQL Server uses a normalized representation of an expression, called a view-rep, which is easier to manipulate than a tree representation of expressions. To check if expression E2 subsumes expression E1, first get a view-rep of each of E1 and E2. Note that the view-rep of an expression E is a representation of E in SPGJ (select project group-by join) normal form, that is, as a projection on a selection, on a cross-product, with an optional group-by/aggregation operation on top.

Intuitively, given the view-reps of E1 and E2, subsumption of E1 by E2 in $E1 \bowtie_\theta E2$ can be tested by checking that E2 has a subset of the relations that E1 has, and there is a mapping from the relations in E2 to those in E1, such that the following conditions hold: the predicates in the selection in the view-rep of E2 are weaker than the corresponding predicates in E1 (that is, the predicates in E1 imply the predicates in E2), and the semi-join condition in $\bowtie_\theta$ equates corresponding columns of E1 and E2.

These conditions are a minor variant of the conditions for rewriting using a materialized view, so the existing view matching code can be re-used with minor changes. One primary change is that view matching requires that E1 and E2 have the same set of relations. This can be relaxed to allow E2 to have a subset of the relations of E1.

Figure 6:
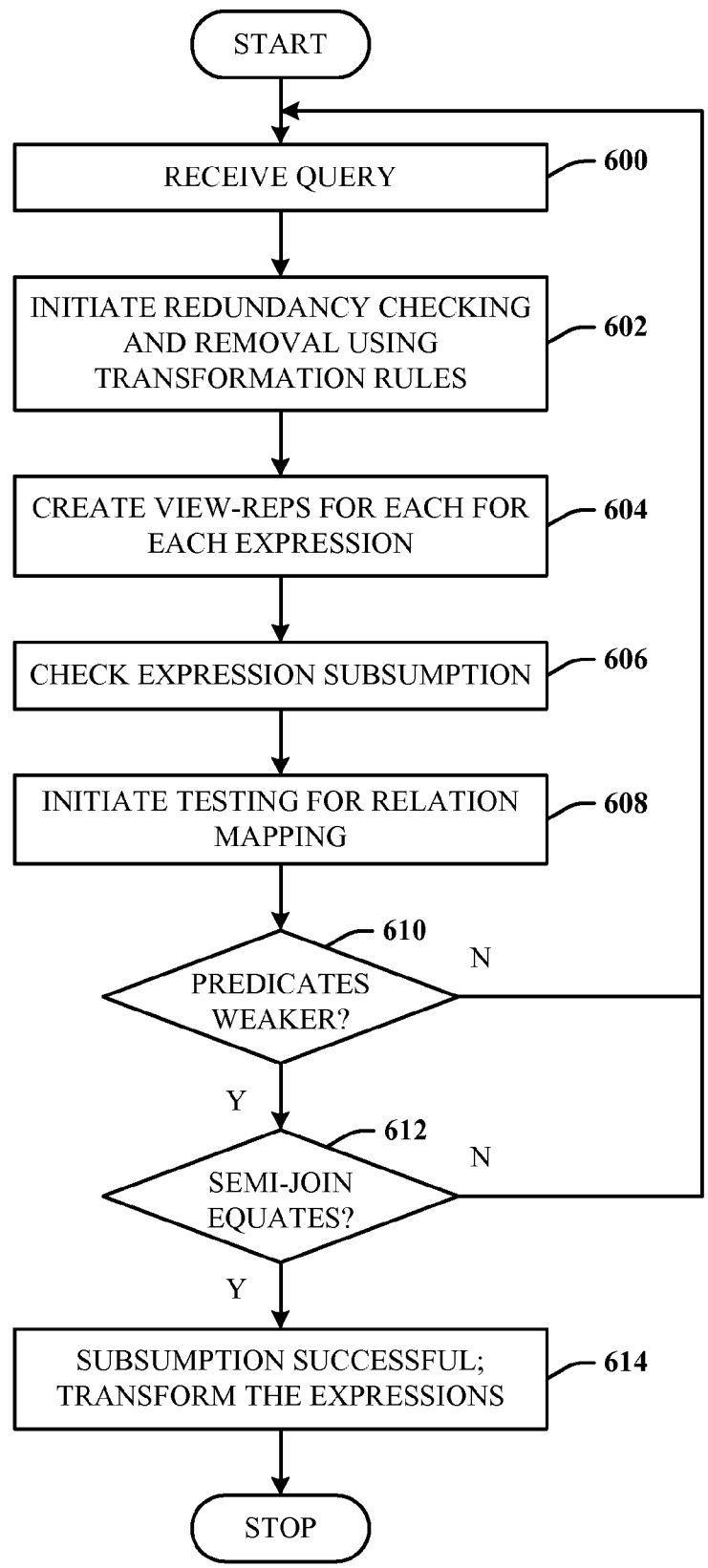
FIG. 6 illustrates a flow diagram of a methodology of checking subsumption according to an aspect.

FIG. 6 illustrates a flow diagram of a methodology of checking subsumption according to an aspect. At 600, a query is received for processing. At 602, redundancy checking is initiated by the optimizer using transformation rules. At 604, view-reps are created and received for each expression for redundancy checking via the view matching component. At 606, subsumption is checked using the view-rep of each expression such that an expression (E2) subsumes another expression (E1) when expression E2 has a subset of the relations contained in the expression E1. At 608, test for a mapping from the relations in expression E2 to the relations in expression E1. At 610, if the predicates in the selection in the view-rep of E2 are weaker than the corresponding predicates in E1 (that is, the predicates in E1 imply the predicates in E2), flow progresses to 612, where the system tests a semi-join condition. If the semi-join condition in $\bowtie_\theta$ equates corresponding columns of E1 and E2, flow progresses to 614 where subsumption tests successfully according to the conditions. In another case, flow progresses from 610 and 612 back to 600 to start the process over for the next query.

Consider a (rewritten) query of the form, $( \ldots ((R1 \bowtie_{\theta_1} A1) \bowtie (R2 \bowtie_{\theta_2} A2)) \bowtie \ldots (Rn \bowtie_{\theta_n} An))$.

One or more of the Ai's (where i=1, 2, 3, . . . , n) could be redundant. For example, the relations in the access control condition A1 could be mapped to the relation Rk, and if the remaining conditions for subsumption hold, the semi-join with A1 can be deleted. In general, the problem of redundancy removal is similar to the problem of query minimalization which was shown to be NP (non-deterministic polynomial time)—Complete for conjunctive queries. However, for the purpose of fine-grained authorization, it is desired to detect redundancy between the predicates in the query and the predicates in the authorizations. This can be facilitated using a normalized form of the query in which all the authorization semi-joins are pulled up the query tree. This can be implemented as a transformation rule in the optimizer. For the above example, the normalized version of the query can be of the form, (( . . . (R1⋈R2⋈ . . . ⋈Rn)⋈$_{\theta_1}$A1) . . . ⋈$_{\theta_n}$An).

Redundancy removal is performed in a simplification stage by adding a few transformation rules to the query optimizer. For example, at a semi-join E1⋈$_\theta$E2, check if the view-rep of E2 subsumes the view-rep of E1, and the semi-join conditions equate corresponding columns defined by the mapping from E2 to E1. If so, transform E1⋈$_\theta$E2 to E1.

Another transformation rule can be, given an authorization with disjunction of subquery expressions, such as

```
SELECT * FROM E1
WHERE (A IN (SELECT ...))
      OR (EXISTS (SELECT ...)),
``` a first phase of the optimizer transforms the where-clause expression into (in-effect) a disjunction of semi-joins. Thereafter, the subsumption test is applied to each of the disjuncts. If any one of the disjuncts is found to subsume the another, the entire set of semi-joins can be discarded.

Note also that redundancy removal is best done before decorrelation transformations are applied, since they may translate semi-joins into outer-joins, which would make redundancy testing harder.

Figure 7:
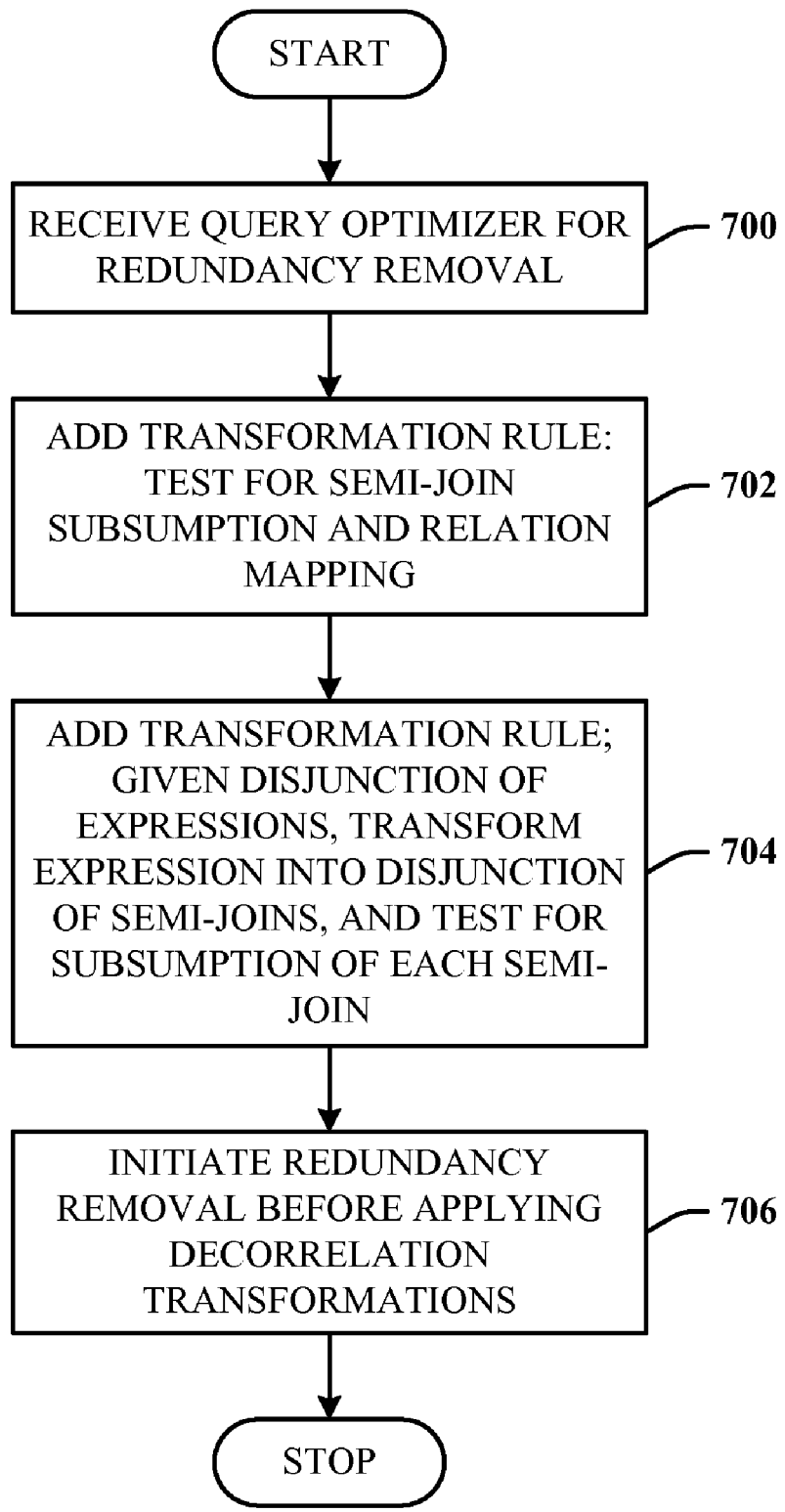
FIG. 7 illustrates a methodology of performing redundancy removal using a query optimizer according to an innovative aspect.

Accordingly, FIG. 7 illustrates a methodology of performing redundancy removal using a query optimizer according to an innovative aspect. At 700, an optimizer is received for redundancy removal. At 702, a transformation rule is added for processing by the optimizer that tests for semi-join subsumption and relation mapping, as described supra. At 704, a transformation rule is added for processing by the optimizer that, given a disjunction of expressions, transforms the expression into a disjunction of semi-joins, and tests for subsumption of each of the semi-joins. At 706, the optimizer processes redundancy removal before decorrelation transformations are applied.

Notice that the above technique is only a heuristic; it does not guarantee to eliminate all redundant authorizations. For instance, the number of authorizations removed could vary based on the order of the Ai's in the normalized version of the query. However, this heuristic works well in practice and is easy to integrate in an existing optimizer infrastructure. In the following section, the problem of information leakage in the presence of UDFs is addressed.

While fine-grained access control guarantees that the results seen are only those that are authorized, it does not by in itself guarantee that the query is safe. In general, USFs, which include UDFs, as well as system-defined functions and operators that can leak information through exceptions and error messages. Following is a description of UDFs, when a query plan can be judged as safe with respect to UDF invocations, and how an optimizer can be extended to generate safe query plans. Additionally, handling leakage through exceptions is also addressed.

Reconsidering the example illustrated in the Background section, the rewritten query (after incorporating the authorization view) was

```
SELECT * FROM myemployees
WHERE myudf(salary),
``` where myemployees represents an authorization view that involves a subquery. The optimizer could, however, pick a plan for evaluating this query in which the myudf is pushed below an access control check. In such cases, the UDF has access to tuples that it is not authorized to see. The code defining the UDF is not under the control of the authorization system and it could, in general, print out or write to a relation the salary values that it is passed.

This example illustrates that in general, information can be leaked if a UDF is invoked on data that is not authorized to be seen. Note that the optimizer's decision to push-down or pull-up a UDF can be entirely cost based, and not based on whether the particular placement would result in a plan in which the UDF has access to unauthorized information. Thus, in order to prevent information leakage through USFs, the optimizer needs to take into account safety of query plans while exploring different alternatives for placement of UDFs. This safety analysis of query plans can be separate from cost-based analysis, or in addition to cost-based analysis.

Note also that the techniques described herein for UDF safety are equally applicable to other channels such as exceptions and error messages.

Figure 8:
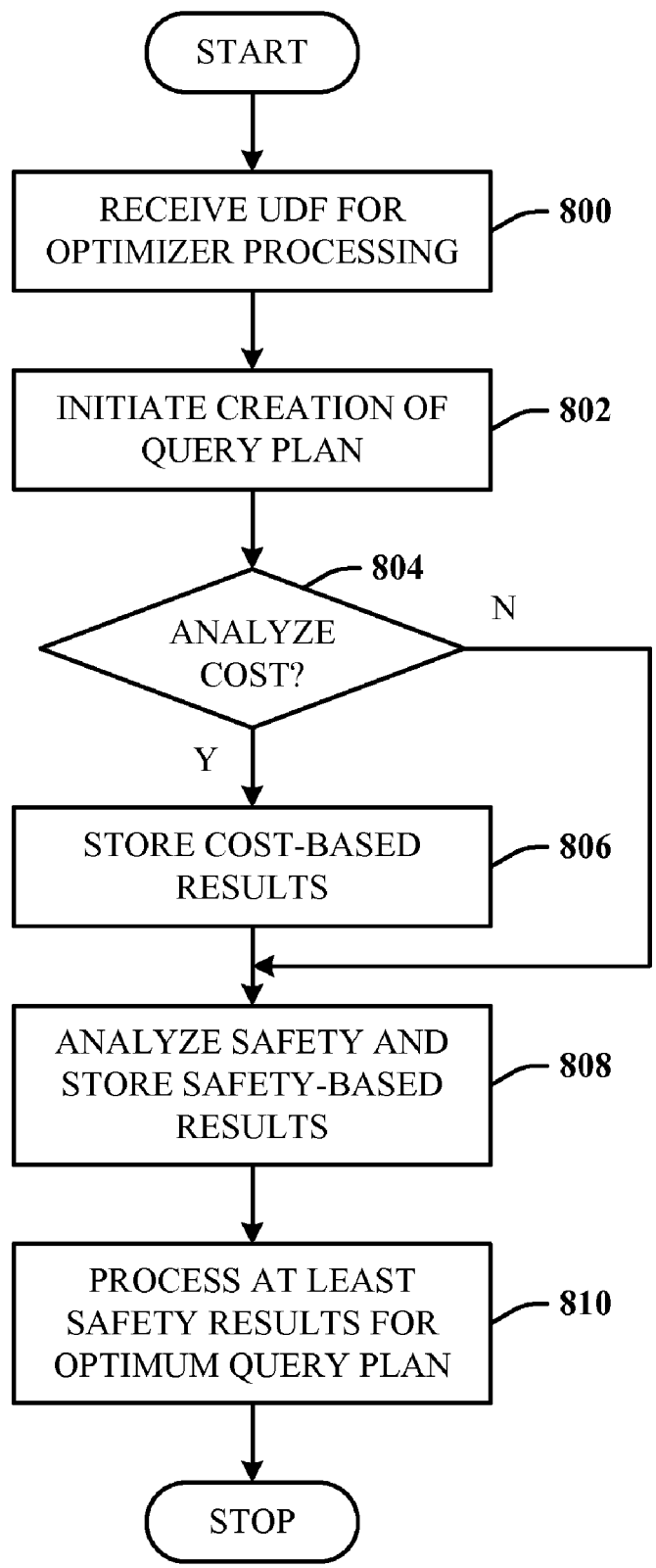
FIG. 8 illustrates a methodology of analyzing a UDF for leakage information according to an aspect.

FIG. 8 illustrates a methodology of analyzing a UDF for leakage information according to an aspect. At 800, a UDF is received for processing by a query optimizer. At 802, the optimizer initiates creation of a query plan. At 804, the methodology tests whether to perform cost-based analysis. If yes, at 806, the cost-based results are stored. At 808, the optimizer performs safety-based analysis to take into account safety of the query plan while further exploring different alternatives. At 810, the optimizer processes at least the safety results to arrive an optimum query plan. At 804, if cost-based analysis is not performed, flow can then proceed to 808 to continue with safety-based analysis. It is to be understood that the system can utilize both cost-based and safety-based results in arriving at the optimum query plan. However, as indicated, this is not required.

Described hereinafter, is how a query optimizer can be extended to reason about safety of query plans, while generating plans involving UDFs. As defined herein, a UDF or system-defined function/operator is verified (or safe) if it has been verified (e.g., manually) to not leak any information; all other functions are USFs. The function userId ( ), which returns the identifier of the current user, is a UDF in the SQL sense, but it is known that it will not cause exceptions or leak information in any other fashion. Accordingly, safe functions in a query can be ignored when testing for safety.

Consider first an example naïve approach (albeit, an incorrect approach) to determining safety of a query plan. Further, consider that a USF invocation in a query plan is judged to be safe if all its parameters are from relations that have their access control checks enforced. It may appear that since each value passed to the USF is in the result of an authorized view, there can be no information leakage. In reality, information can be leaked not only by values that are revealed, but also by values that are not revealed, as the following example shows. Consider that the user is allowed to access all tuples from the employee relations, and only those tuples from the relation medical-record(emp_id, disease), and that appear in the following view:

```
CREATE VIEW mymedical-record AS
    SELECT * FROM medical-record
    WHERE emp_id in Q2.
```

Consider that the user executes the following query

```
SELECT * FROM employee E, mymedical-record
    WHERE E.emp_id = mymedical-record.emp_id
    AND disease='AIDS' AND udf2(E.name).
```

If the chosen query plan checks the condition emp_id in Q2 as the last step in the query execution plan, after the execution of the UDF udf2 ( ), then the plan satisfies the above naïve condition, but the UDF is still called with names of all people with AIDS, which was not authorized.

Note that the function userId ( ) which returns the identifier of the current user, is a UDF in the SQL sense, but can be treated as a verified UDF, since it is system defined and it is known that it will not leak information. Verified UDFs in a query can be ignored when testing for safety.

Although not illustrated herein, there exist several alternative query plans where the user has full access to the employee relation, and the parameter E.name to udf2 in the alternative plans trivially satisfies the above naïve condition. However, in one of the plans, names of all employees having the AIDS disease reach udf2, some of which may not have qualified the subquery Q2, thereby leaving a channel open for information leakage. Thus, the above naïve condition does not guarantee safety with respect to USF invocations.

Now consider a correct solution. Before proceeding, parameters to a subquery expression are addressed. If a subquery has a USF in it (or nested anywhere below it), it can reveal information about the parameter values. For example, in the following query,

```
SELECT * FROM employee E, mymedical-record
    WHERE E.emp_id = mymedical-record.emp_id
    AND disease='AIDS'
    AND EXISTS
        (SELECT * FROM R WHERE udf2(E.name))
``` where R is any non-empty relation. If the subquery were called with the name of an employee that has not yet been tested for authorization, the UDF in the subquery can reveal information. Accordingly, the invocation of such a subquery should be treated in the same fashion as the invocation of a USF. The optimizer represents correlated evaluation plans algebraically using an apply operator E1AE2; the apply operator A invokes its right input E2 for each tuple generated by its left input E1. Correlation variables are bound by E1 and used by E2.

The safety of correlated subqueries can be formalized in terms of apply operators. For every apply operator that has an unverified UDF in its right input, the left input must be authorized. Following is a description of how a query optimizer can be extended to generate safe query plans.

One necessary component of this solution is the ability to infer where a query expression is authorized. A possible approach is to infer if an expression is authorized by using view matching. Given a query expression, it can be inferred to be safe if there is an equivalent rewriting of the expression that uses only the authorization views. A problem with this approach is that checking if a result is authorized is a frequent operation, which may have to be done on many subexpressions generated by a query optimizer.

Accordingly, consider the following definitions.

Definition 1: (Authorized Expression) A result of an expression (or subexpression) is authorized if it can be computed as an expression using only authorized views as inputs. An important issue in a practical implementation is to efficiently infer whether an expression is authorized.

Definition 2: (Safety with respect to USFs) A node in a plan for a query/subquery without any correlation variables is safe with respect to USFs if:
1. there are no USFs in the node or its descendants; or
2. it is not an apply operator, and it has a USF in its root operator, and all its inputs are safe and authorized; or
3. it is an apply operator, both its children are safe, and either (a) the right child (subquery) does not have any USF invocations, or (b) the left child is authorized A plan is safe if its root node is safe (or, equivalently, all its nodes are safe).

Following is a description of how to infer if a subexpression in a plan is authorized. To do so, find an expression that has as leaves authorized views (that is, relations along with their authorization predicates) that are equivalent to the subexpression. The task can be difficult in that the problem of query equivalence is NP complete as described supra, it is unknown which expression on authorized views to compare the subexpression. Conventional inference rules check for authorization, where the goal is to check for authorization of the given query. In contrast, the instant innovation applies authorization tests to a potentially large number of subexpressions generated by a query optimizer.

A "validity propagation" approach can be employed to infer authorization, which can be used to infer authorization for multiple subexpressions at a low cost. The intuition behind the approach is as follows. Authorized views (which replace the relations) in a query plan are all marked as authorized and any expression generated during optimization is marked as authorized if all its inputs have been marked as authorized.

More formally, the validity propagation approach modifies the optimizer to infer authorization of expressions as follows. In a Volcano/Cascades optimization framework, for example, an expression is represented by a group (or equivalence node), representing a group of equivalent expressions. A group can have multiple children, each of which is an operation node (such as join or selection); the children of the operation node are in turn equivalence expressions. Transformation rules can add more operation node children to a group node.

In the validity propagation approach, authorization is maintained as a group property in the optimizer's memo structure. This property is not dependent on which particular plan is chosen to implement the expression. Starting with a rewritten form of a query in which each relation Ri is replaced by $(Ri \bowtie_{\theta_1} Ai)$, groups corresponding to individual $(Ri \bowtie_{\theta_1} Ai)$ expressions can be initially marked as authorized.

The following inference rule is then used repeatedly. Rule IA: If all the children group nodes of an operation node are marked as authorized, the group node which is the parent of the operation node is also marked as authorized. By applying Rule IA, it can be inferred that an additional group node G6 is also authorized. A subtle point is the fact that a group node G1 might not be inferred as authorized when it is created, but later, if a new expression is added as a child of G1, it allows inferring that G1 is authorized. This information can in turn allow deducing that a parent (or ancestor) group is authorized. As a result, whenever a group is inferred to be authorized, the authorization property changes are propagated up to parent and ancestor groups in the memo structure. A distinguishing aspect from conventional systems is that conventional system assume that transformation rules have been completely applied before checking for validity (authorization). In contrast, according to the subject invention, the inference takes place while transformations are being applied. The rule can be quite powerful, as the following theorem shows.

Theorem 1: If the entire search space is explored by the optimizer, every authorized expression that is generated will be marked as authorized using the inference Rule IA.

Figure 9:
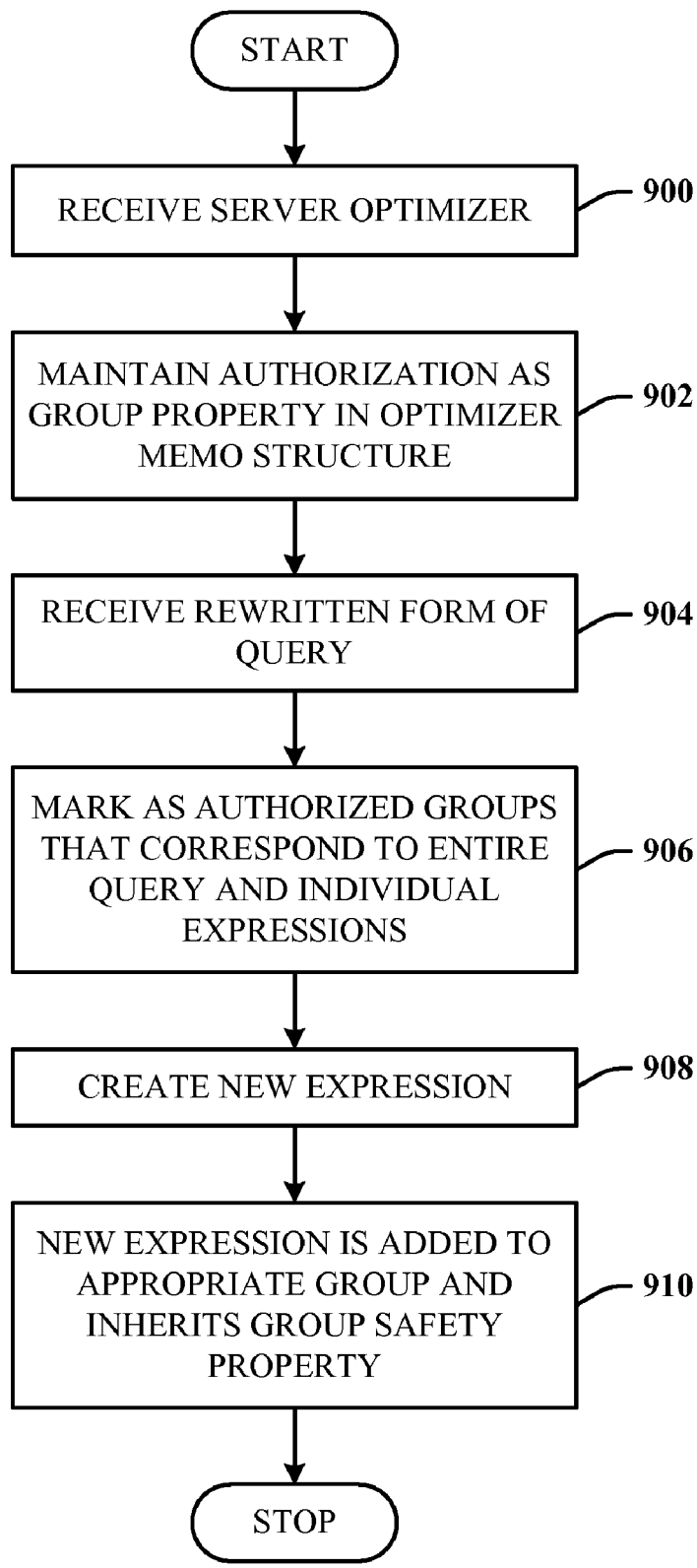
FIG. 9 illustrates a flow diagram of a methodology of inferring expression authorization according to an aspect.

FIG. 9 illustrates a flow diagram of a methodology of inferring expression authorization according to an aspect. At 900, a server optimizer is received for modification. At 902, authorization is maintained as a group property in the SQL Server optimizer's memo structure. At 904, a rewritten form of a query is received for processing. The rewritten query can include one or more relations such that each relation Ri is replaced by $(Ri \bowtie_{\theta_1} Ai)$. At 906, the groups corresponding to the entire query and the individual $(Ri \bowtie_{\theta_1} Ai)$ expressions are initially marked as authorized. At 908, whenever a new query expression is created, it is added to an appropriate group and inherits the group's safety property, as indicated at 910.

A subtle point is the fact that a group G1 may not be inferred as authorized when it is created, but a safe expression can be found later. Now, a parent (or ancestor) group might possibly be deducible to be authorized, because group G1 has been found to be authorized. As a result, propagate the authorization property changes up to ancestor groups in the memo structure whenever a group to be authorized is inferred. Accordingly, the following theorem can be employed: If the entire search space is explored by the optimizer, every authorized expression will be marked as authorized.

Predicates (and select clause expressions) containing UDFs are handled specially by adding new transformation rules to the optimizer. Two different approaches are possible.

In one implementation, a rule-based optimizer, such as a SQL Server optimizer (e.g., an extensible optimizer that is based on Volcano/Cascades) can be modified to generate safe query plans involving USFs. Heuristics can be readily devised to find a safe plan. One naïve method is to ensure that the USF invocations are never pushed down (by disabling the corresponding optimizer rule for UDF/selection/projection push down). Since the USFs stay at the top of the query plan, all the necessary access control checks will be applied before USF invocation and the resulting query plan would be safe. However, the plan obtained can be far from optimal, especially if the USFs are used in predicates that are very selective (e.g., eliminate most tuples).

Another possible approach is to tweak the optimal unsafe plan (by pulling up USFs) until the plan becomes safe. This technique requires relatively little modification of the query optimizer. However, the resultant plan may not be the optimal safe plan, and may in fact be quite inefficient compared to the optimal safe plan. Moreover, to check if a node in the query plan is authorized, the memo structure may be needed after the query is expanded, as well as the memo structures of the authorization views after expansion.

Given that the memo structures are needed anyway, it is natural to ask if there is a principled way to extend the search algorithm of the query optimizer to find the optimal safe plan. This can be achieved by enforcing safety either at every transformation rule (that involve USFs) or only when picking the final plan.

The two strategies are discussed as follows. A first approach is to modify all of the optimizer rules such that USFs are only pushed on top of authorized expressions. The transformation rule that pushes USF to a query expression succeeds only if the query expression is known to be authorized. This approach would generate a safe query plan. A potential drawback, however, is that the rule may fail if a group which is actually authorized has (not yet) been inferred to be authorized. Some candidate plans may be missed as a result.

A second approach allows unsafe transformations but enforces safety when picking the optimal plan. In this second approach, USFs are pushed down (as a transformation, not a substitution) even to potentially unauthorized query expressions. When the optimal plan is picked, the safety property can be enforced using an existing optimizer feature called required/derived properties. The physical operators derive the safety property from their corresponding logical operators, while the procedure that finds the optimal plan ensures that only plans satisfying the safety property are considered. This is similar to the notion of enforcing a sort order to support an order-by clause.

The two approaches are related. It can be shown that in certain cases the two approaches would explore the same set of safe plans as the following theorem states.

Theorem 2—For the case of conjunctive (SPJ—select project join) queries, if the entire search space of the optimizer is explored, all the safe plans that can be obtained by the second approach can also be obtained by the first approach.

Integrating Redundancy Removal and Safety. As described supra, redundancy removal can be implemented by transformation rules that pull up semi-joins and detect redundancy using the view matching infrastructure. Additionally, rules can be executed as part of query simplification (since redundancy removal is almost always guaranteed to produce a better plan, much like pushing down selections). However, it turns out there is a subtle interaction between redundancy removal and safety inference of UDFs. A key point is that in order to infer if sub-expressions are authorized using the validity propagation approach, the query expression which is input to the transformation phase is in the canonical form shown below, with authorization checks intact.

$$( \ldots ((R1 \bowtie A1) \bowtie (R2 \bowtie A2)) \bowtie \ldots (Rn \bowtie An))$$

If redundancy removal were applied prior to the transformation phase, some of the Ai's could have been eliminated, and the validity propagation approach would then not be able to infer many intermediate results to be authorized even if they actually are: for if any Ai is found to be redundant and deleted, notice that Ri will not be part of any authorized expression. A couple of ways to circumvent this problem are now described.

Redundancy Removal During Transformation. One approach to solving this problem is to apply redundancy removal during the transformation phase (instead of the simplification phase), so that the Ai's are preserved and can be used to infer authorization.

To prevent other simplification rules from affecting the normal form, authorization-anchor operation nodes are introduced before the simplification stage, which nodes prevent transformations that pull up any of the Ri's or Ai's, or push down any operation into the Ri⋈Ai expressions. At the start of the transformation phase, the authorization-anchor nodes are removed and the corresponding groups are marked as authorized. Propagation of authorization is done as usual during optimization. (Propagating the authorization marking up on the initial query tree can result in all the parent/ancestor groups being marked as authorized. However, only some of groups added subsequently may be authorized.) mark as authorized Redundancy removal rules are then applied during the transformation phase. Because groups have alternatives with the authorization predicates in place, authorization of groups can be inferred using the validity propagation approach. At the same time, the group can have other equivalent expressions with redundant parts removed, allowing more efficient evaluation. Thus, an optimal safe plan can be obtained.

Note that in one implementation, the redundancy removal rules can be substitution rules, which allow partial pruning of the search space when redundancy is detected. This can reduce the optimization overhead compared to an approach that does not remove redundancy, or which does not do the partial pruning mentioned above. However, the overhead, in this case, is larger than when redundancy removal is applied in the simplification stage, because the redundancy of semi-joins gets tested multiple times, and because of the increased search space due to late detection of the redundant parts.

An interesting challenge in applying redundancy removal as part of the transformation phase is the fact that this could lead to potential cycles in the memo structure. For instance, when eliminating a semi-join, a child node can be generated that is equivalent to the parent and is part of the same group. In one implementation, the optimizer has support for handling cycles in the memo.

Conditioned Authorization. A different approach to integrating safe plan generation is to perform redundancy removal at simplification time, but use an extended notion of authorization, referred to herein as conditioned authorization. (Note: this notation is not to be confused with the conventional conditional validity notion.) With conditioned authorization, instead of marking an expression as authorized, it is marked as authorized, conditioned on a join/semi-join with another expression. For example, given a relation Ri with authorization Ai, Ai could possibly be deleted by redundancy removal or moved elsewhere in the expression during simplification. Relation Ri can be marked as authorized, conditioned on Ai, that is, conditioned on the relation Ri being joined/semi-joined with Ai. (The join condition can be added to the authorization, but for simplicity, the join condition is omitted in this discussion.) Note that authorization conditioned on an empty expression is the same as unconditioned authorization.

Groups (or equivalence nodes in the memo) can derive their authorizations as follows. If any child is unconditionally authorized, so is the group; otherwise, authorization is a disjunction of conditions from children (which can be suitably simplified).

The rule for propagating authorization can then be modified. For example, when an expression that is authorized conditional on Ai is joined with an authorized expression that contains Ai as a subexpression, it can be inferred that the resultant expression is unconditionally authorized. The extended propagation rule is as follows:

If an operation has two child groups E1 and E2 that are each authorized conditioned on A1 and A2 respectively, the result of the operation is authorized conditioned on A1 and A2.

The conditioned authorization can be simplified in some cases: if A1 subsumes E2, A1 can be dropped from the conditioned authorization (and similarly for A2).

If simplification results in an empty condition, it can be inferred that the expression is unconditionally authorized. Note that if A1 were dropped as redundant, surely the query would have had an expression that is subsumed by A1, which will be joined with R1 at some point in the query plan. At this point, the authorization condition A1 would get dropped.

Handling Exceptions and Error Messages. What has been described is one or more mechanisms for handling USFs by moving them to safe locations. The most common USFs are built-in functions and operations (such as division or conversion to integer) that can cause exceptions or error messages (such as divide by zero or a bad input error message), such as in some examples provided hereinabove.

Execution costs can be improved significantly for built-in functions, as follows. For each built-in function (or operation), create a safe version of the function that ignores exceptions, that does not output error messages, and that does not have any side effects. For instance, create a safe version of the division function, which catches exceptions, and returns a null value.

Predicates using unsafe functions can be rewritten using the corresponding safe versions of the functions in such a way that the rewritten predicate is weaker than the original one. In the example supra, a safe version of the predicate (1/(salary−100K)=0.23) can be created by using the safe division. However, replacing an unsafe function in a predicate by a safe function may allow tuples through that would not have passed the original predicate (e.g., the predicate 1/(salary−100K) is null) and vice-versa. However, the predicate can be rewritten using safe functions in such a way that it is weaker than the original condition. The rewriting process has to deal with negations and null/unknown results.

The safe version of the predicate can be pushed down while retaining the unsafe version on top, above authorization predicates. In general, let the original predicate be $\theta$, and the rewritten safe one be $\theta 1$. A selection $\sigma_\theta(E)$ can then be transformed to $\sigma_\theta(\sigma_{\theta 1}(E))$, and the rewritten selection $\theta 1$ pushed down into the query. The original predicate $\theta$ remains on top to filter out tuples that get erroneously included by $\theta 1$.

Note that catching exceptions can alter the behavior of the query in terms of what it executes before an exception prevents further execution; this is especially true for updates that are not transactional. However, even in current SQL implementations the behavior in such situations is not defined by the SQL standard, and depends on the query plan chosen.

Figure 10:
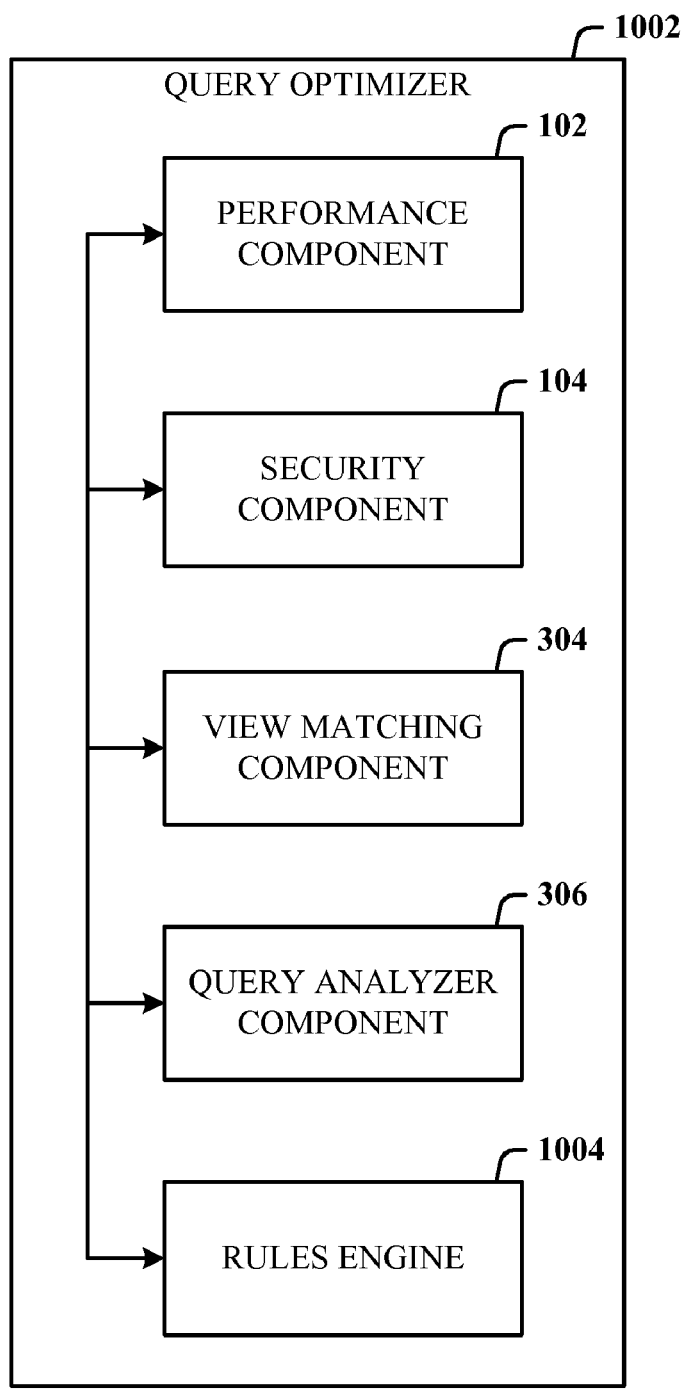
FIG. 10 illustrates a rules-based query system in accordance with the subject innovation.

FIG. 10 illustrates a rules-based query system 1000 in accordance with the subject innovation. The system 1000 can include a query optimizer 1002, which can be a component of a database management system used to analyze queries submitted to the database server for execution, and then determine an optimal way to execute the query plan. The query optimizer 1002 evaluates all of the different possible plans for executing the query and returns what it considers the best alternative. The optimizer includes the analyzer component 306 that analyzes a query to determine if any optimizations can be used to process the query more quickly.

As illustrated, the rule-based query optimizer 1002 can also include a rules engine 1004 that processes rules for query analysis and query plan creation. Rules can be in the form of transformation rules that map one algebraic expression into another algebraic expression, and implementation rules that map an algebraic expression into an operator tree. The rule-based query optimizer 1002 can also include the performance component 102 and the security component 104 that are described in FIG. 1, and the view matching component 304 for replacing base relations of the query by matching views.

Figure 11:
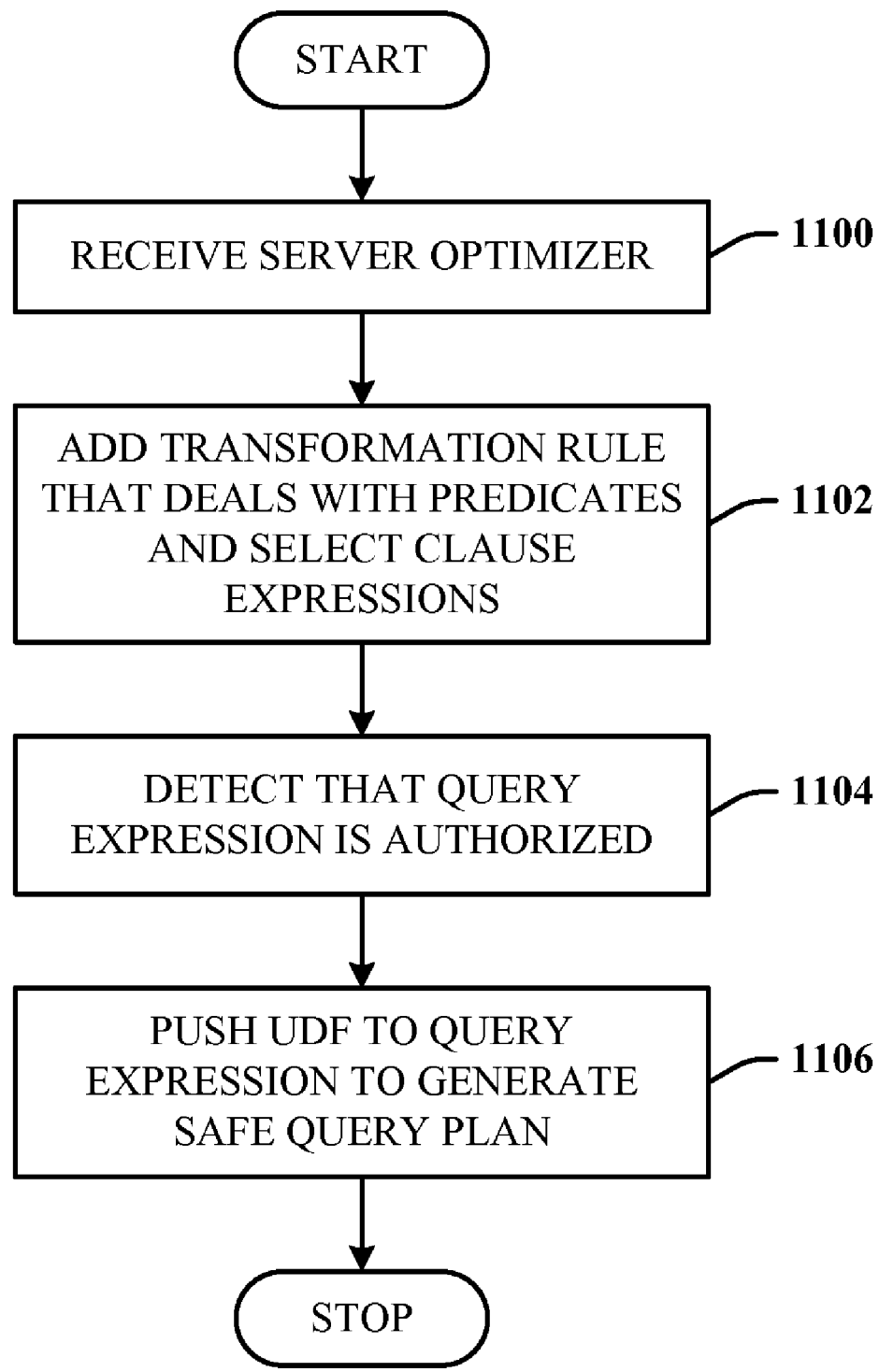
FIG. 11 illustrates a methodology of allowing only safe transformation in accordance with an aspect.

FIG. 11 illustrates a methodology of allowing only safe transformation in accordance with an aspect. At 1100, a server optimizer is received for modification. At 1102, a transformation rule is added that handles predicates and select clause expressions. The transformation rule that pushes UDF to a query expression succeeds only if the query expression is known to be authorized. Accordingly, at 1104, the system detects that the query expression is authorized. At 1106, the UDF is pushed to a query expression to generate a safe query plan. A potential drawback of this methodology is that the rule may fail if a group which is actually authorized has (not yet) been inferred to be authorized. Some candidate plans may be missed as a result.

Figure 12:
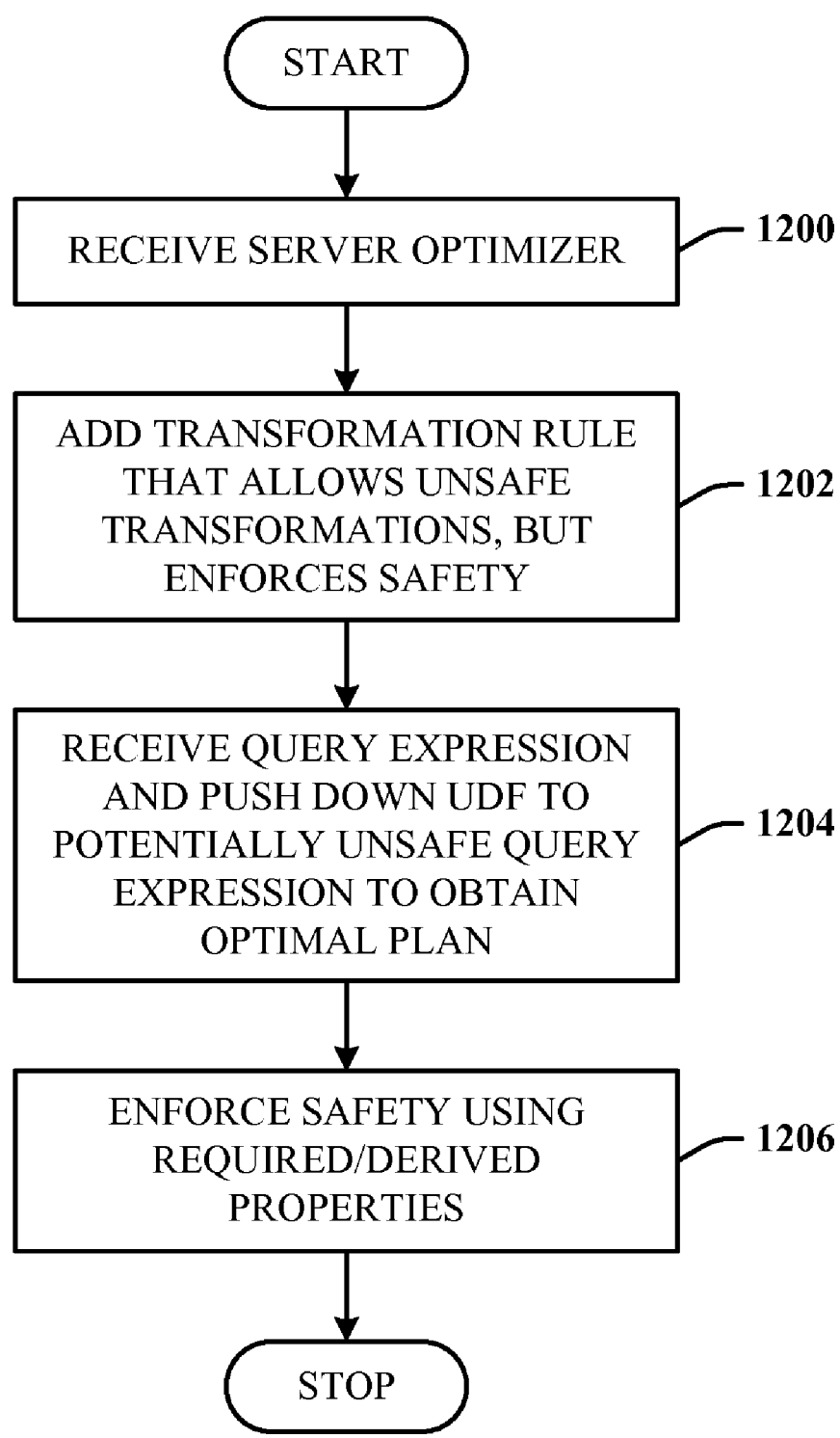
FIG. 12 illustrates an alternative methodology of allowing unsafe transformations in accordance with an aspect.

FIG. 12 illustrates an alternative methodology of allowing unsafe transformations in accordance with an aspect. At 1200, a server optimizer is received for modification. At 1202, a transformation rule is added that allows unsafe transformations, but enforces safety. At 1204, a query is received and UDFs are pushed down (as a transformation, not a substitution) to potentially unsafe query expressions. While the optimal plan is picked, the safety property is enforced using an SQL Server optimizer feature called required/derived properties, as indicated at 1206.

Figure 13:
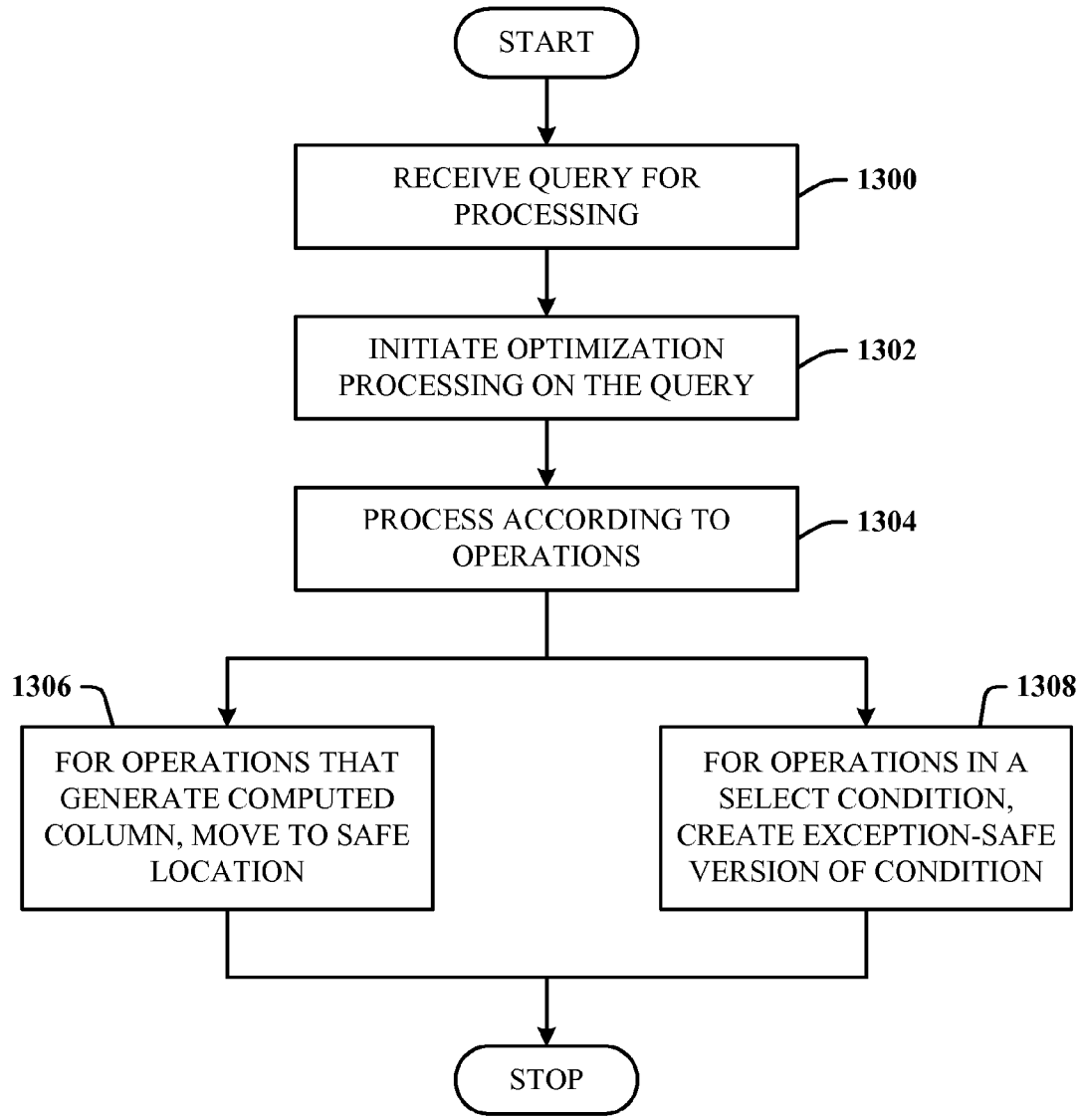
FIG. 13 illustrates a flow diagram of a methodology of preventing leak information via exceptions and error messages in accordance with an innovative aspect.
Figure 14:
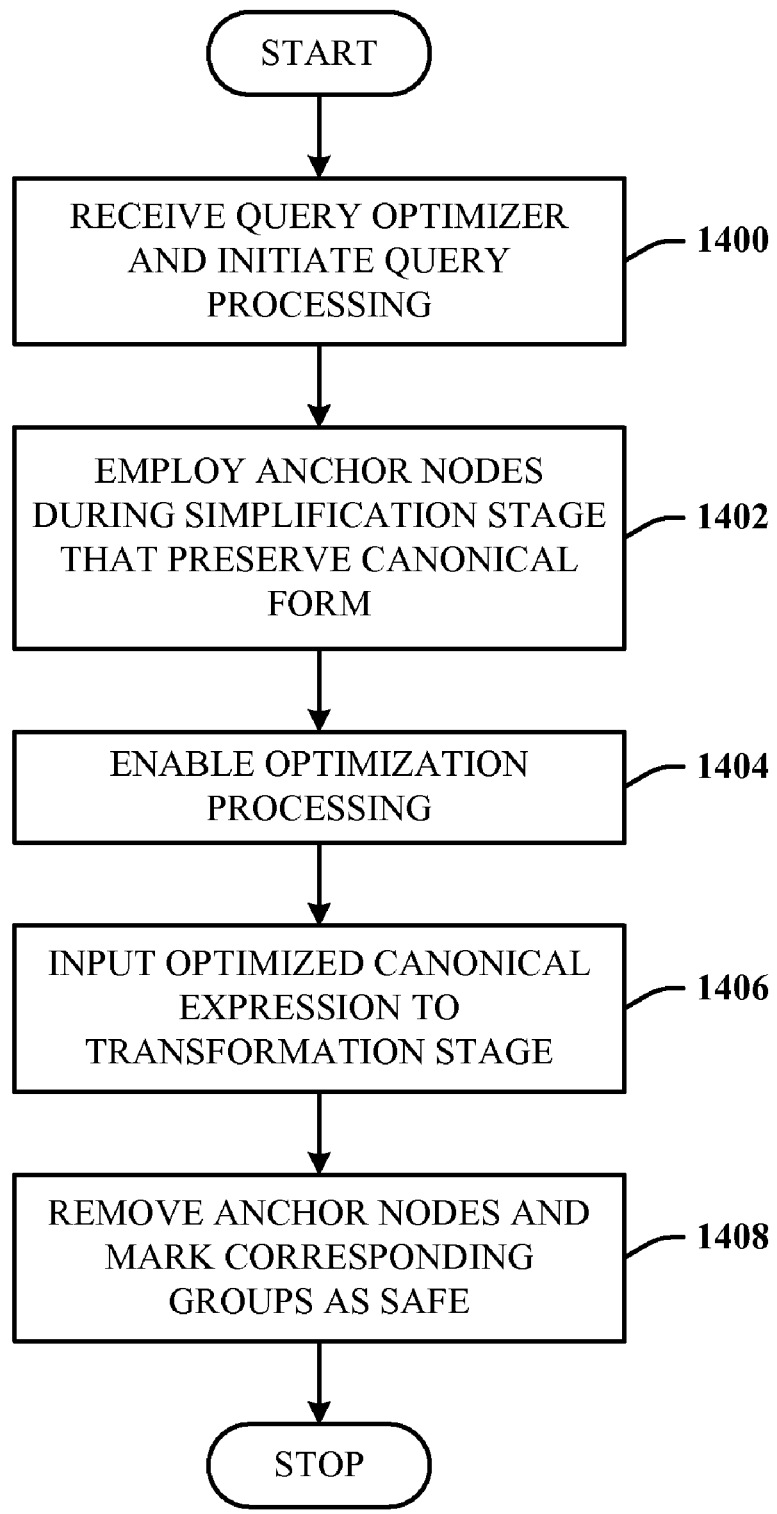
FIG. 14 illustrates a methodology of employing redundancy removal and safety processing according to an innovative aspect.

FIG. 13 illustrates a flow diagram of a methodology of preventing leak information via exceptions and error messages in accordance with an innovative aspect. At 1300, a query is received for processing. At 1302, initiate optimization on the query. At 1304, process according to operations. At 1306, for operations that generate a computed column, move the operations to a safe location.

At 1308, for operations in a selection condition, create an exception-safe version of the condition, which is guaranteed to not cause an exception. This can involve catching an exception in an arithmetic expression, and hiding the exception, but the resultant condition must be weaker than the original. Care should be taken to handle negations and null/unknown results when generating the weakened expression.

Note that catching exceptions can alter the behavior of the query in terms of what it executes before an exception prevents further execution; this is especially true for updates that are not transactional. However, even in current SQL implementations, the behavior in such situations is not defined by the SQL standard, and depends on the query plan chosen.

Benefits of Redundancy Removal. Provided herein is a example scenario that illustrates the benefits of redundancy removal, the sample scenario using the TPCH schema. Consider a user who is trying to analyze data that have been shipped in the last ten years. For this user, the database administrator may need to create authorization views in order to ensure that the user is not allowed to access data from an earlier period. A possible set of authorization views are shown below.

```
authLineitem:
    SELECT * from FROM lineitem
    WHERE l_shipdate > '1995-01-01'
authOrders:
    SELECT * FROM orders WHERE
    o_orderkey in (SELECT l_orderkey FROM lineitem
```

```
            WHERE l_shipdate > '1995-01-01')
authSupplier:
    SELECT * FROM supplier WHERE
    s_suppkey in (SELECT l_suppkey FROM lineitem
            WHERE l_shipdate > '1995-01-01')
authCustomer:
    SELECT * from FROM customer
    WHERE c_custkey in
        (SELECT o_custkey FROM orders
        WHERE o_orderkey in
    (SELECT l_orderkey FROM lineitem
    WHERE l_shipdate > '1995-01-01'))
```

The views essentially restrict access in each of the tables to only those tuples that correspond to a line item that has been shipped after 1995. Input queries (using a view rewrite model) will be rewritten by replacing each of the base relations with the corresponding authorization views. The query predicates are modified in the TPCH queries to restrict the access to only those line items that have been shipped after 1995. Thus, the authorization checks for the purpose of this experiment are all redundant.

Table 1 shows the benefits of performing redundancy removal for a few queries from the TPCH suite of varying complexity. For instance, Query 6 is a single table query, while the rest of the queries involve multiple joins. Query 10 is a join between four tables and the rewritten version of the query has three additional (redundant) joins. For each query, the execution times with and without redundancy removal is illustrated.

TABLE 1

Results with Redundancy Removal

| TPCH Query | Execution Time (without RR) | Execution Time (with RR) |
| --- | --- | --- |
| Query 3 | 100.00 | 48.28 |
| Query 6 | 56.03 | 38.79 |
| Query 10 | 94.83 | 55.45 |
| Query 12 | 77.57 | 43.97 |
| Query 14 | 49.14 | 38.79 |

The execution times shown have been normalized. The transformation rules described hereinabove detected and eliminated all the redundant semi-joins which were added as a result of the authorization views. The additional optimization overheads (due to redundancy removal) were about 10-15%, which is reasonable, given the sizable gains in execution time. As the data indicates, redundancy removal can lead to a significant difference and is an essential component in implementing fine-grained access control using the view rewrite model. Without the novel techniques described UDF safety has to be ensured by never pushing down UDFs.

Plan Safety and Redundancy Removal. In this section, the effectiveness of redundancy removal and safe UDF pushdown are illustrated by way of example. Note that authorization views, in general, can be fairly complex and involve multiple semi-joins. A hypothetical scenario is constructed using the TPCH schema. Assume a database administrator who needs to create authorizations for all managers/customers in Europe. The authorization views would essentially restrict access to information that is only pertinent to regions in Europe, by using appropriate semi-joins.

The authorization views for the different relations are shown below in relational algebra to give an idea of their complexity (the selection predicate on the region table selects regions that are in Europe). The example shows that even such a simple scenario could result in complex authorization views.

authNation: provides access to nation information that are in Europe:
(Nation $\bowtie_{\theta 1}(\sigma_\theta$(Region)))

authCustomer: provides access to customer information that are in some nation in Europe.
(Customer $\bowtie_{\theta 2}$(Nation $\bowtie_{\theta 1}(\sigma_\theta$(Region)))

authOrders: provides access to orders that have been placed by customers from a nation in Europe.
(Orders $\bowtie_{\theta 3}$(Customer $\bowtie_{\theta 2}$(Nation $\bowtie_{\theta 1}(\sigma_\theta$(Region)))))

authLineitem: provides access to line items that have been ordered by some customer in Europe.
(Lineitem $\bowtie_{\theta 4}$(Orders $\bowtie_{\theta 3}$(Customer $\bowtie_{\theta 2}$(Nation $\bowtie_{\theta 1}(\sigma_\theta$(Region))))))

authSupplier: provides access to suppliers that have supplied some line items for an order placed by some customer in Europe.
(Supplier $\bowtie_{\theta 5}$(Lineitem $\bowtie_{\theta 4}$(Orders $\bowtie_{\theta 3}$(Customer $\bowtie_{\theta 2}$(Nation $\bowtie_{\theta 1}(\sigma_\theta$(Region)))))))

As the view definitions indicate, the authorization views include multiple semi-joins to restrict access to only those tuples that are relevant. Now, consider a query issued by a manager in Europe in order to examine the details of suppliers who supplied the line item's for the "sensitive" orders that were placed by customer in Europe. Suppose a UDF sensitiveOrder( ) is used to define which orders are sensitive, and it is not verified and may be unsafe. The preprocessor will replace the relations in the user query by the corresponding authorization views to obtain the following query.

```
SELECT * FROM authSupplier, authLineitem, authOrders
WHERE s_suppkey = l_suppkey
  AND l_orderkey = o_orderkey
  AND o_custkey in
    (SELECT c_custkey FROM authCustomer
     WHERE c_nationkey in
       (SELECT n_nationkey FROM authNation
        WHERE n_regionkey in
          (SELECT r_regionkey FROM authRegion
           WHERE r_name='europe')))
  AND dbo.sensitiveOrder(o_totalprice)
```

The above query is then rewritten by expanding the authorization views. It can be seen that the rewritten query would forgo some redundant authorization checks since the query is only evaluated on European regions anyway. Additionally, execution time can be added for an unsafe query with redundancy removal, in the simplification phase for concreteness, although this can also be performed in the transformation phase.

In the absence of the techniques described herein, an implementation of fine-grained access control would process this query without removing any redundancies and by pulling the UDF to the highest level in query plan. The resulting plan executes in 100 units of time (after normalization). It is found that that for either of the described techniques-redundancy removal or placing UDF safely-helps reduce the execution times by about 50%.

Finally, when applying both the techniques, the execution time is further reduced by about another 50%. Thus, both redundancy removal and safe UDF pushdown can be employed together for the best performance in implementing fine-grained access control.

It has been shown that the safe optimal plan can potentially be much more efficient than safe plans obtained using simple heuristics. Following is a description of the optimization overheads involved in finding the safe optimal plan.

Redundancy removal can be performed either at the simplification phase or the transformation phase. A difference is the overhead costs involved. Performing redundancy removal during transformations is quite expensive compared to performing redundancy removal during simplification. This is because redundancy removal at simplification time can reduce the size of the query very significantly. A more robust solution is to employ redundancy removal in the simplification stage and still use safe UDF placement. This can be achieved using the notion of conditioned authorization inference as described hereinabove. Since simplification can have the same effect in this case, and conditioned authorization inference is similar in cost to materialized view matching, which is quite efficient, the optimization costs will be similar to simplification+UDF at top, which is quite low.

As a general, but not inclusive summary, redundancy removal can give very significant performance improvements with low optimization overhead, and can reduce optimization costs greatly. Secondly, although pulling USFs to the top works well in several cases, optimal placement of USFs can give significantly better results in many cases. Thirdly, it is feasible to modify an optimizer to generate safe plans.

Figure 15:
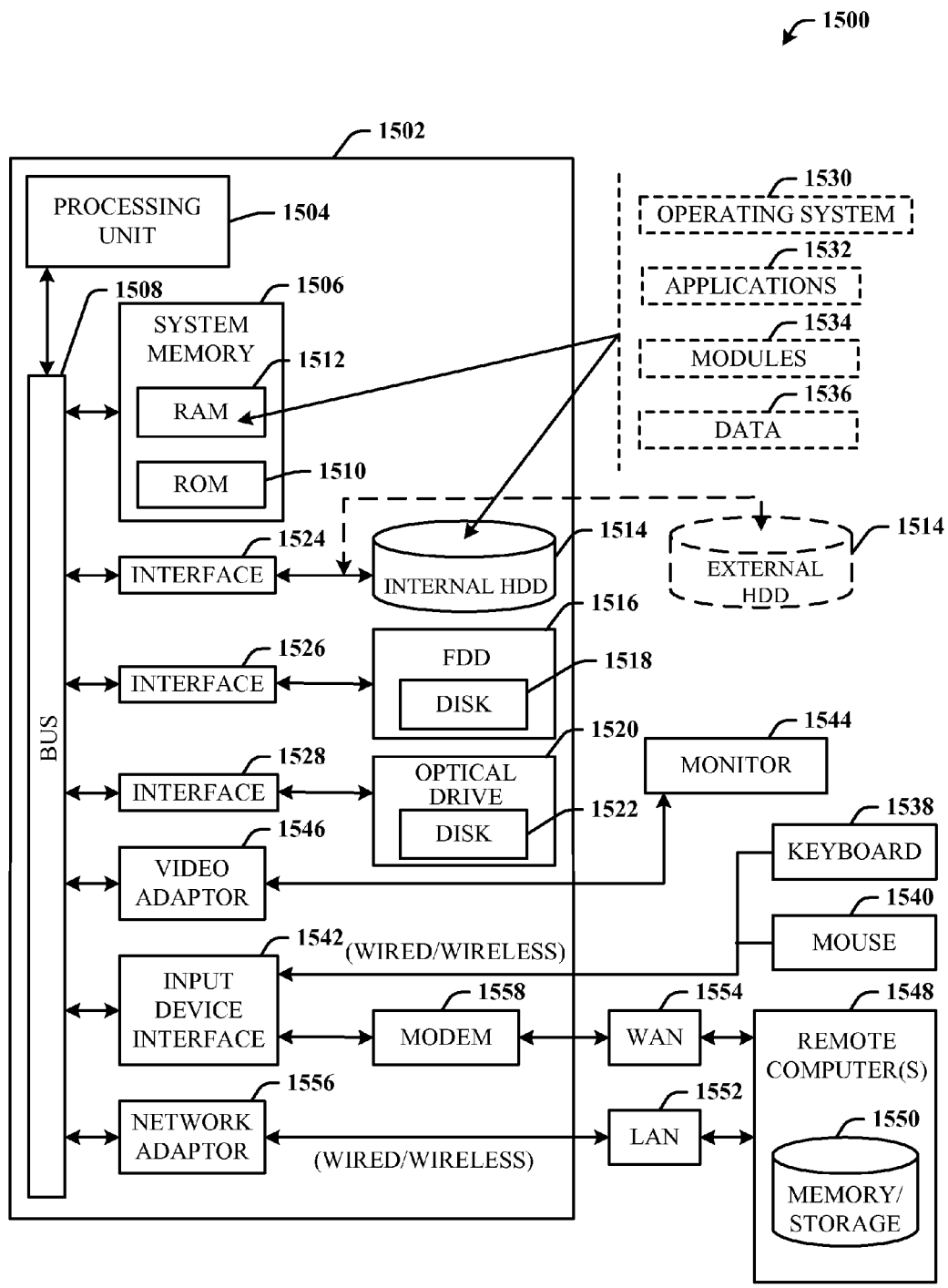
FIG. 15 illustrates a block diagram of a computer operable to execute the disclosed architecture.

Referring now to FIG. 15, there is illustrated a block diagram of a computer operable to execute the disclosed architecture. In order to provide additional context for various aspects thereof, FIG. 15 and the following discussion are intended to provide a brief, general description of a suitable computing environment 1500 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 15, the exemplary environment 1500 for implementing various aspects includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures may also be employed as the processing unit 1504.

The system bus 1508 can be any of several types of bus structure that may further interconnect to a memory bus (with or without a memory controller), a peripheral bus, and a local bus using any of a variety of commercially available bus architectures. The system memory 1506 includes read-only memory (ROM) 1510 and random access memory (RAM) 1512. A basic input/output system (BIOS) is stored in a non-volatile memory 1510 such as ROM, EPROM, EEPROM, which BIOS contains the basic routines that help to transfer information between elements within the computer 1502, such as during start-up. The RAM 1512 can also include a high-speed RAM such as static RAM for caching data.

The computer 1502 further includes an internal hard disk drive (HDD) 1514 (e.g., EIDE, SATA), which internal hard disk drive 1514 may also be configured for external use in a suitable chassis (not shown), a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1502, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. It is to be appreciated that the innovation can be implemented with various commercially available operating systems or combinations of operating systems.

A user can enter commands and information into the computer 1502 through one or more wired/wireless input devices, e.g., a keyboard 1538 and a pointing device, such as a mouse 1540. Other input devices (not shown) may include a microphone, an IR remote control, a joystick, a game pad, a stylus pen, touch screen, or the like. These and other input devices are often connected to the processing unit 1504 through an input device interface 1542 that is coupled to the system bus 1508, but can be connected by other interfaces, such as a parallel port, an IEEE 1394 serial port, a game port, a USB port, an IR interface, etc.

A monitor 1544 or other type of display device is also connected to the system bus 1508 via an interface, such as a video adapter 1546. In addition to the monitor 1544, a computer typically includes other peripheral output devices (not shown), such as speakers, printers, etc.

The computer 1502 may operate in a networked environment using logical connections via wired and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wired/wireless connectivity to a local area network (LAN) 1552 and/or larger networks, e.g., a wide area network (WAN) 1554. Such LAN and WAN networking environments are commonplace in offices and companies, and facilitate enterprise-wide computer networks, such as intranets, all of which may connect to a global communications network, e.g., the Internet.

When used in a LAN networking environment, the computer 1502 is connected to the local network 1552 through a wired and/or wireless communication network interface or adapter 1556. The adaptor 1556 may facilitate wired or wireless communication to the LAN 1552, which may also include a wireless access point disposed thereon for communicating with the wireless adaptor 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wired or wireless device, is connected to the system bus 1508 via the serial port interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 16:
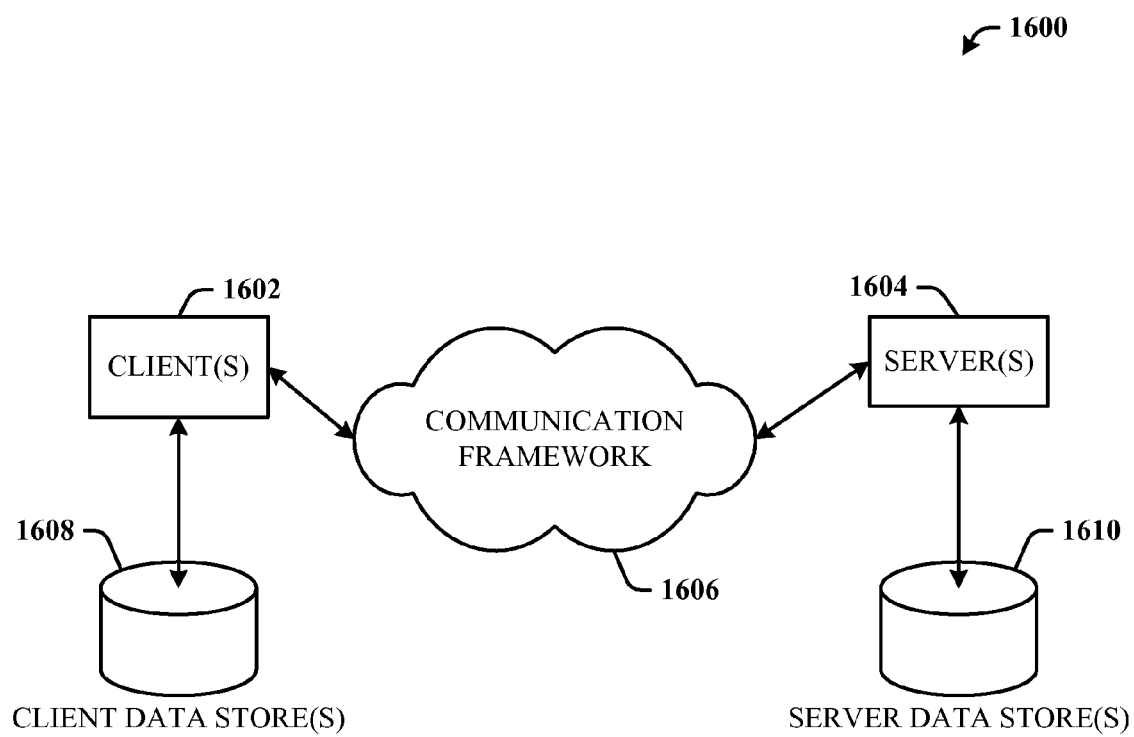
FIG. 16 illustrates a schematic block diagram of an exemplary computing environment.

Referring now to FIG. 16, there is illustrated a schematic block diagram of an exemplary computing environment 1600 in accordance with another aspect. The system 1600 includes one or more client(s) 1602. The client(s) 1602 can be hardware and/or software (e.g., threads, processes, computing devices). The client(s) 1602 can house cookie(s) and/or associated contextual information by employing the subject innovation, for example.

The system 1600 also includes one or more server(s) 1604. The server(s) 1604 can also be hardware and/or software (e.g., threads, processes, computing devices). The servers 1604 can house threads to perform transformations by employing the invention, for example. One possible communication between a client 1602 and a server 1604 can be in the form of a data packet adapted to be transmitted between two or more computer processes. The data packet may include a cookie and/or associated contextual information, for example. The system 1600 includes a communication framework 1606 (e.g., a global communication network such as the Internet) that can be employed to facilitate communications between the client(s) 1602 and the server(s) 1604.

Communications can be facilitated via a wired (including optical fiber) and/or wireless technology. The client(s) 1602 are operatively connected to one or more client data store(s) 1608 that can be employed to store information local to the client(s) 1602 (e.g., cookie(s) and/or associated contextual information). Similarly, the server(s) 1604 are operatively connected to one or more server data store(s) 1610 that can be employed to store information local to the servers 1604.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system that facilitates fine-grained access control of a database, comprising:
   a processor configured to execute computer-readable instructions;
   a performance component for detecting and removing redundant authorizations associated with a query expression, the removing including:
      implementing a set of transformation rules, the transformation rules including:
         testing for semi-join subsumption and relation mapping; and
         given disjunction of query expression, transforming the expression into a disjunction of semi-joins, and testing for subsumption of each of the semi-joins; and
      initiating redundancy removal before applying decorrelation transformations;
   security component for controlling information leakage associated with the query expression, the security component configured to identify at least one unsafe function in the query expression and to determine an optimal safe location for the at least one unsafe function in an optimal query plan; and
   a safety component for maintaining safety of the query plan, the query plan including a relocation of the at least one unsafe function to a safe location determined in part by a safety analysis and in part by a cost-based analysis, the unsafe functions including user defined functions, system-defined functions, and operators that may reveal information whether directly or by means of exception or error messages, the maintaining including:
      parsing the query expression and determining base relations of the query expression;
      specifying authorizations based on predicated grants in the query expression;
      creating a regular view by combining a plurality of authorizations made to a user; and
      giving permission to the user on the regular view instead of underlying relations.

2. The system of claim 1, wherein the information leakage is via at least one of an error message and an exception.

3. The system of claim 1, wherein the information leakage is via a user-defined function (UDF).

4. The system of claim 1, further comprising a query optimizer that processes the query expression to generate the optimal query plan, the query optimizer includes the security component.

5. The system of claim 1, wherein the performance component facilitates the removal of redundant authorization via materialized views by matching the materialized views with parts of the query expression.

6. The system of claim 1, further comprising a view matching component that employs subsumption checking.

7. The system of claim 6, wherein the subsumption checking comprises testing that a first expression includes a subset of relations in a second expression.

8. The system of claim 1, wherein the performance component checks for redundancy between predicates in a query and predicates in authorizations.

9. The system of claim 1, wherein the performance component removes the redundant authorizations during a simplification stage.

10. The system of claim 1, wherein the security component controls the leakage information leakage based on safety analysis.

11. A computer-implemented method of performing fine-grained access control of a database, comprising:
    receiving a query expression for processing against the database;
    evaluating a plurality of possible plans for executing the query expression, the evaluating including:
       comparing cost associated with each plan; and
       in an event that the query expression includes a join, determining a join plan and an order in which tables are evaluated or joined;
    removing redundant authorizations associated with the query expression;
    implementing a set of transformation rules, the transformation rules including:
       testing for semi-join subsumption and relation mapping; and
       given disjunction of query expression, transforming the expression into a disjunction of semi-joins, and testing for subsumption of each of the semi-joins; and
    generating a safe query plan, the safe query plan including a relocation of at least one unsafe function to an optimal safe location determined in part by a safety analysis and in part by a cost-based analysis; and
    maintaining safety of the query plan, the maintaining including:
       parsing the query expression and determining base relations;
       specifying authorizations based on predicated grants in the query expression;
       creating a regular view by combining a plurality of authorizations made to a user; and giving permission to the user on the regular view instead of underlying relations.

12. The method of claim 11, further comprising an act of inferring the safe query plan.

13. The method of claim 11, further comprising an act of detecting that the query expression is authorized.

14. The method of claim 11, further comprising an act of inferring the safe query plan by inputting an expression to a transformation phase, which expression is in a canonical form.

15. The method of claim 11, wherein the act of removing is performed at simplification time.

16. The method of claim 11, wherein the act of removing utilizes a condition authorization that marks the expression as authorized based on a join/semi-join with another expression.

17. The method of claim 11, further comprising an act of adding a join condition to one of the authorizations.

18. One or more computer-readable storage media having stored thereon a plurality of instructions that, when executed, configures a processor to perform acts that facilitate fine-grained access control of a database, the acts comprising:
- receiving a query expression for processing against the database;
- optimizing the query expression, the optimizing including:
  - evaluating a plurality of possible plans for executing the query expression, the evaluating including:
    - comparing cost associated with each plan, the cost being derived from an estimation of a number of I/O operations required, calculations to produce a result, and rows accessed; and
    - in an event that the query expression includes a join, determining a join plan and an order in which tables are evaluated or joined;
- removing redundant authorizations associated with a query plan, the removing including:
- implementing a set of transformation rules, the transformation rules including:
  - testing for semi-join subsumption and relation mapping; and
  - given disjunction of query expression, transforming the expression into a disjunction of semi-joins, and testing for subsumption of each of the semi-joins; and
- initiating redundancy removal before applying decorrelation transformations; and
- maintaining safety of the query plan, the query plan including a relocation of at least one unsafe function to an optimal safe location determined in part by a safety analysis and in part by a cost-based analysis, the unsafe functions including user defined functions, system-defined functions, and operators that may reveal information whether directly or by means of exception or error messages, the maintaining including:
- parsing the query expression and determining base relations;
- specifying authorizations based on predicated grants in the query expression;
- creating a regular view by combining a plurality of authorizations made to a user; and
- giving permission to the user on the regular view instead of the underlying relations.

* * * * *